(12) United States Patent
Anderson et al.

(10) Patent No.: US 8,244,203 B2
(45) Date of Patent: *Aug. 14, 2012

(54) RF CIRCUIT MODULE

(75) Inventors: Andrew Reino Anderson, Golden Valley, MN (US); Glen Brian Backes, St. Cloud, MN (US); Richard Thomas Demulling, Circle Pines, MN (US); Dominic Louwagie, Eden Prairie, MN (US); Todd Charles Ortberg, Chanhassen, MN (US); Edward F. Sansone, Coon Rapids, MN (US)

(73) Assignee: ATX Networks Corp., Ontario (CA)

( * ) Notice: Subject to any disclaimer, the term of this patent is extended or adjusted under 35 U.S.C. 154(b) by 1473 days.

This patent is subject to a terminal disclaimer.

(21) Appl. No.: 11/712,233

(22) Filed: Feb. 28, 2007

(65) Prior Publication Data

US 2008/0014898 A1 Jan. 17, 2008

Related U.S. Application Data

(63) Continuation of application No. 10/623,449, filed on Jul. 18, 2003, now Pat. No. 7,197,294, which is a continuation of application No. 09/879,669, filed on Jun. 12, 2001, now Pat. No. 6,650,885, which is a continuation of application No. 09/500,107, filed on Feb. 8, 2000, now Pat. No. 6,289,210, which is a continuation of application No. 08/761,525, filed on Dec. 6, 1996, now Pat. No. 6,049,709.

(51) Int. Cl.
*H04B 1/08* (2006.01)

(52) U.S. Cl. ...................................................... 455/349

(58) Field of Classification Search ................. 455/3.01, 455/3.02, 3.03, 3.06, 300, 301, 344, 347, 455/349, 351, 575.1, 90.3; 361/785, 814, 361/816; 174/32, 35 R
See application file for complete search history.

(56) References Cited

U.S. PATENT DOCUMENTS

| | | | |
|---|---|---|---|
| 3,717,813 A | 2/1973 | Lieberman et al. |
| 4,661,998 A | 4/1987 | Yamashita et al. |
| 4,813,886 A | 3/1989 | Roos et al. |
| 5,058,198 A | 10/1991 | Rocci et al. |
| 5,130,893 A | 7/1992 | Straate et al. |

(Continued)

FOREIGN PATENT DOCUMENTS

DE    1 690 798    5/1972

(Continued)

OTHER PUBLICATIONS

Exhibit A, Complaint; *ADC Telecommunications, inc. v. ATX Incorporated and PCI Technologies Inc.*; Civil Action No. 08-cv-05275-JNE-JJK; dated Sep. 26, 2008; 9 pgs.

(Continued)

*Primary Examiner* — Quochien B Vuong
(74) *Attorney, Agent, or Firm* — Brinks Hofer Gilson & Lione

(57) ABSTRACT

A module for radio frequency signal circuits includes an electrically conductive housing. Coax connectors are secured to the rear face of the housing. A circuit board is contained within the interior spaced between sidewalls of the housing. A ground side of the circuit board includes a layer of electrically conductive material which is electrically connected to the housing. Coax cables extend within the interior of the housing from the coax connectors and between the ground side of the circuit board and an opposing sidewall. An opposite side of the circuit board contains circuit components interconnected with one another through a plurality of circuit paths.

164 Claims, 29 Drawing Sheets

U.S. PATENT DOCUMENTS

| | | | |
|---|---|---|---|
| 5,164,689 | A | 11/1992 | Plonka |
| 5,194,947 | A | 3/1993 | Lowcock et al. |
| 5,280,410 | A | 1/1994 | Klinger et al. |
| 5,355,532 | A | 10/1994 | Kubo et al. |
| 5,363,465 | A | 11/1994 | Korkowski et al. |
| 5,414,597 | A | 5/1995 | Lindland et al. |
| 5,526,525 | A | 6/1996 | Minowa et al. |
| 5,546,282 | A | 8/1996 | Hill et al. |
| 5,563,772 | A | 10/1996 | Nichols |
| 5,628,058 | A | 5/1997 | Hiraki |
| 5,675,300 | A | 10/1997 | Romerein |
| 5,903,829 | A | 5/1999 | Anderson et al. |
| 5,909,155 | A | 6/1999 | Anderson et al. |
| 5,955,930 | A | 9/1999 | Anderson et al. |
| 6,049,709 | A | 4/2000 | Anderson et al. |
| 6,289,210 | B1 | 9/2001 | Anderson et al. |
| 6,650,885 | B2 | 11/2003 | Anderson et al. |

FOREIGN PATENT DOCUMENTS

| | | |
|---|---|---|
| JP | 64-24618 | 1/1989 |
| JP | 3-187297 | 8/1991 |
| JP | 8-181542 | 7/1996 |

OTHER PUBLICATIONS

Exhibit B, Beard Winter LLP letter to ATX Incorporated, dated Oct. 24, 2008; 5 pgs.

Exhibit C, ATX Incorporated letter to ADC Telecommunications, Inc.; dated Oct. 24, 2008; 1 pg.

Exhibit D, *ADC Telecommunications, Inc.* v. *ATX Incorporated and ATX Networks Inc.*; First Amended Complaint; No. 0:08-cv-05275 (JNE/JJK); filed Nov. 14, 2008; 10 pgs.

Exhibit A, "Headend Combining/Splitting Network", Cox Communications, (undated), 16 pgs.

Exhibit B, ADC Telecommunications, Inc. Catalog entitled "Video Signal Distribution Products," 48 pages, Copyright 1996.

Exhibit C, Photographs of modular splitter/combiner (4 pages).

Exhibit D, Antec Network Know-how Product Catalog, front cover page, and pp. C50 through C-57, dated 1994.

Exhibit E, "PathMaker CATV" by Sylvania, pp. 1-25, dated Jul. 1971.

Exhibit F, General Instrument Maintenance Manual for Jerrold Starline CATV Amplifiers, Models JLE-6-450-2W, JLE-7-450-2W, pp. 1-16 produced by PCI Technologies Inc. during litigation with Applicants' assignee, dated Nov. 1983.

Exhibit G, Photographs marked PCI 00089 to PCI 00097 of Prior Art General Instrument Amplifier, Model JLE-7-450-2W (9 pages) produced by PCI Technologies Inc. during litigation with Applicants' assignee, undated.

Exhibit H, Additional Photographs of Prior Art General Instrument Amplifier, Model JLE-7-450-2W (29 pages) taken during litigation between PCI Technologies Inc. and Applicants' assignee, undated.

Exhibit I, Sylvania Pathmaker CATV Application Note, Sub-VHF System Application (20 pages) produced by PCI Technologies Inc. during litigaiton with Applicants' assignee, dated Sep. 1979.

Exhibit J, Documents PCI 00037 to PCI 00039 produced by PCI Technologies to Applicants' assignee relating to C-Cor Electronics Inc. T-500 Series Truck Stations (3 pages), dated Sep. 1982.

Exhibit K, Photographs of QRAM (Quality Racked Amplifier Module), made by QRF, Quality RF Services, Inc. of Jupiter, FL (11 pages), undated.

Exhibit L, Amplifier specifications of QRAM and other amplifiers (4 pages) produced by PCI Technologies Inc. during litigation with Applicants' assignee, undated.

RF CIRCUIT MODULE

This application is a continuation of application Ser. No. 10/623,449, filed Jul. 18, 2003, now U.S. Pat. No. 7,197,294, which is a continuation of application Ser. No. 09/879,669, filed Jun. 12, 2001, now U.S. Pat. No. 6,650,885, which is a continuation of application Ser. No. 09/500,107, filed Feb. 8, 2000, now U.S. Pat. No. 6,289,210, which is a continuation of application Ser. No. 08/761,525, filed Dec. 6, 1996, now U.S. Pat. No. 6,049,709, which applications are incorporated herein by reference.

I. BACKGROUND OF THE INVENTION

1. Field of the Invention

This invention pertains to circuits for broad-band RF systems. More particularly, this invention pertains to modular RF (radio frequency) circuit components.

2. Description of the Prior Art

In the telecommunications industry and more particularly in the video transmission industry, broad-band radio frequency (RF) signals (i.e., 5 MHz to 1 GHz) are carried over coax conductors from a headend to consumers. At the headend of the system, numerous signals are manipulated to achieve a wide variety of functions and objectives. For example, signals carried on numerous coax cables may be combined onto a single coax conductor. Similarly, a signal on a main coax conductor may be divided into a plurality of signals carried on branch coax conductors. Additionally, signals may be added or removed from a main conductor through directional couplers or the like.

In addition to combining, splitting, diverting or adding signals, the headend will also include apparatus for modifying signals. For example, in order to adequately tune the system, it may be desirable to provide attenuators or the like to attenuate a signal to a desired level. Further, as a broadband RF signal is carried over a length of cable, the high frequency range of the signal may be attenuated more than a low frequency range of the signal. As a result, equalizers are utilized to modify the signal to have a level intensity throughout its frequency range.

Throughout the system, performance characteristics are critical. For example, a common performance criteria is to maintain the flatness of a signal. Flatness refers to maintaining a level intensity of a signal throughout its frequency range. For example, if the signal is attenuated by 2 dB at 1 Ghz, then it is desirable that the signal be attenuated at 2 dB at the 5 Mhz frequency. Further, the system needs to be tuned for impedance matching.

Prior art headends include a wide variety of devices to accommodate and accomplish the functions described above. It is desirable to provide an apparatus to accommodate the various functions required at the headend through a modular construction to permit ease of maintenance and cable management in a headend. Such a device must accommodate the performance characteristics of the headend while permitting the modular construction to enhance the cable management and organization of a headend.

II. SUMMARY OF THE INVENTION

According to a preferred embodiment of the present invention, a module is provided for containing a circuit for performing discrete functions on a radio frequency signal. The module comprises a housing of electrically conductive material. The housing has a front face and an opposite rear face. The front face and rear face are separated by opposite sidewalls and opposite end walls. A plurality of coax connectors are secured to the rear face with an outer shield of the connectors electrically connected to the housing. A circuit board is contained within the interior. The circuit board is generally parallel to and spaced between the sidewalls. The circuit board has a component side and a ground side. The ground side includes a layer of electrically conductive material which is electrically connected to the housing. A plurality of coax cable connection locations are provided on the ground side of the circuit board. Each of the coax cable connections includes a ground connection for connecting ground shields of coax cables to the layer of electrically conductive material. The component side of the circuit board includes a plurality of circuit components interconnected with one another and with the coax cable connection locations through a plurality of circuit paths. A plurality of coax cables are disposed within the interior and connected to individual ones of the coax connectors and the coax cable connection locations. Each of the coax cables has a ground shield connected to the outer shields of the connectors and to the ground connections of the coax cable connection locations. A plurality of cables are routed for the cables to be disposed between the ground side of the circuit board and the opposing sidewall of the housing.

III. BRIEF DESCRIPTION OF THE DRAWINGS

IV. DESCRIPTION OF THE PREFERRED EMBODIMENT

Figure 1:
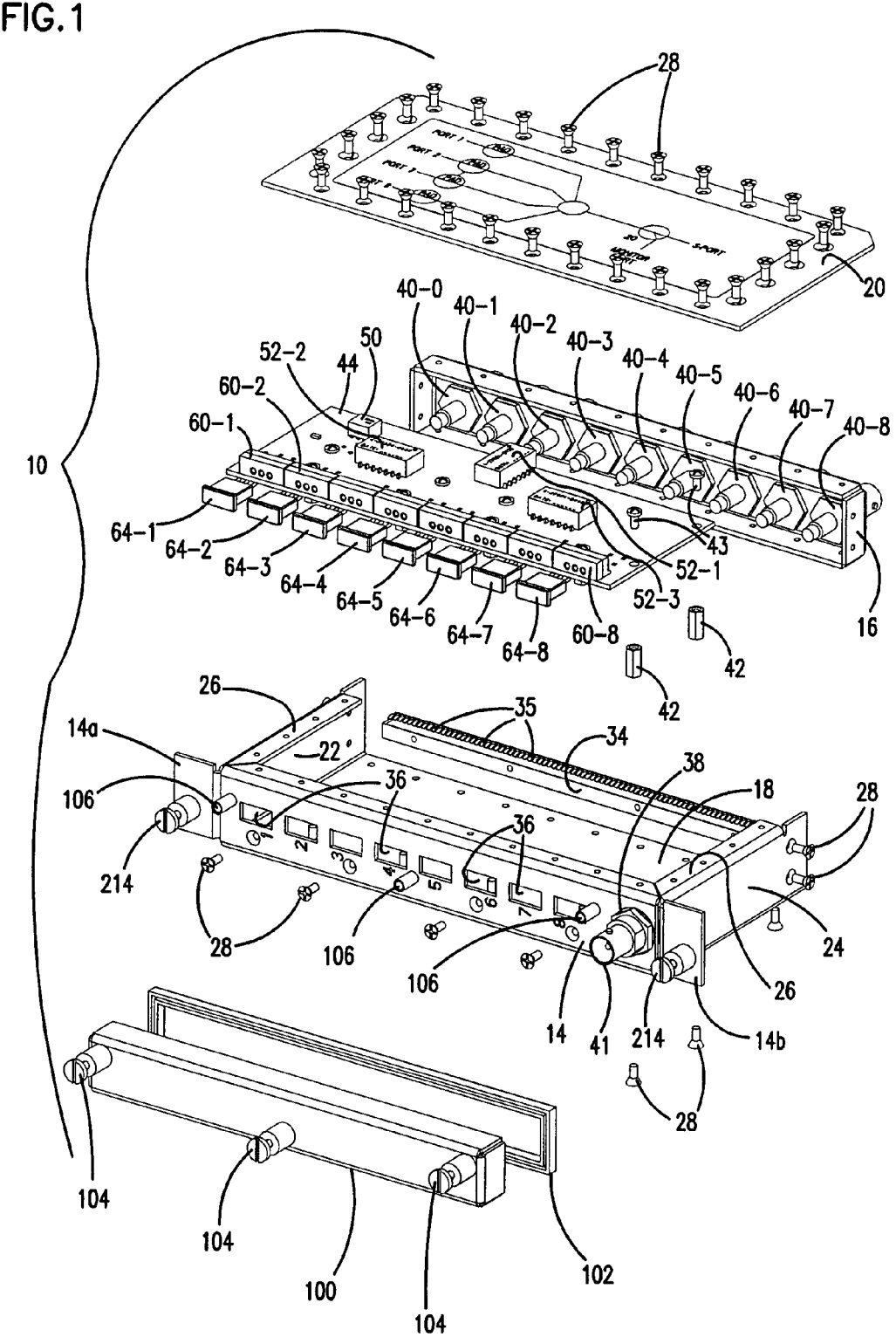
FIG. 1 is a bottom end, front face and right sidewall perspective view of one embodiment of a module according to the present invention shown in exploded view (with internal cables omitted)
Figure 2:
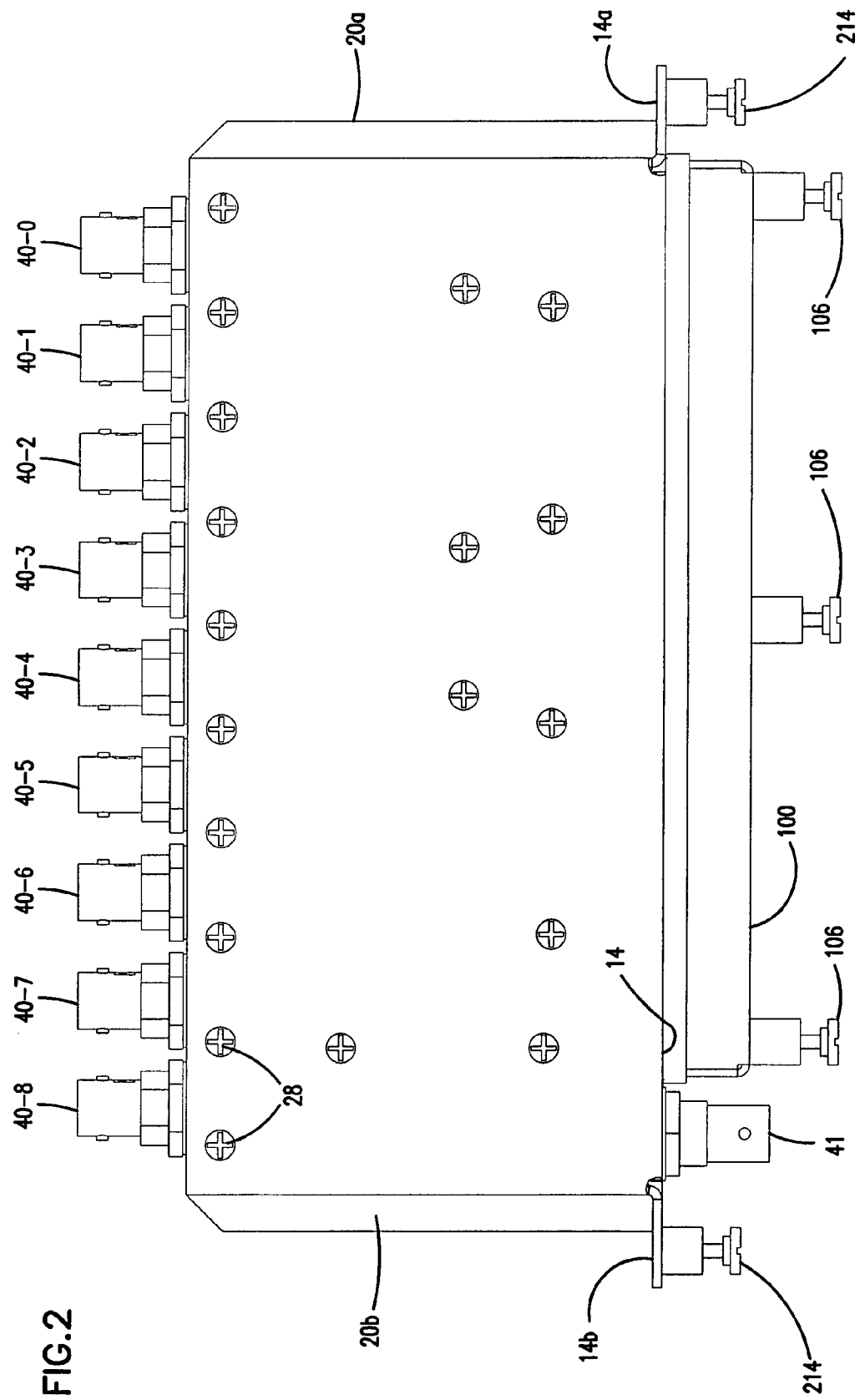
FIG. 2 is a left side plan view of the module of FIG. 1.
Figure 3:
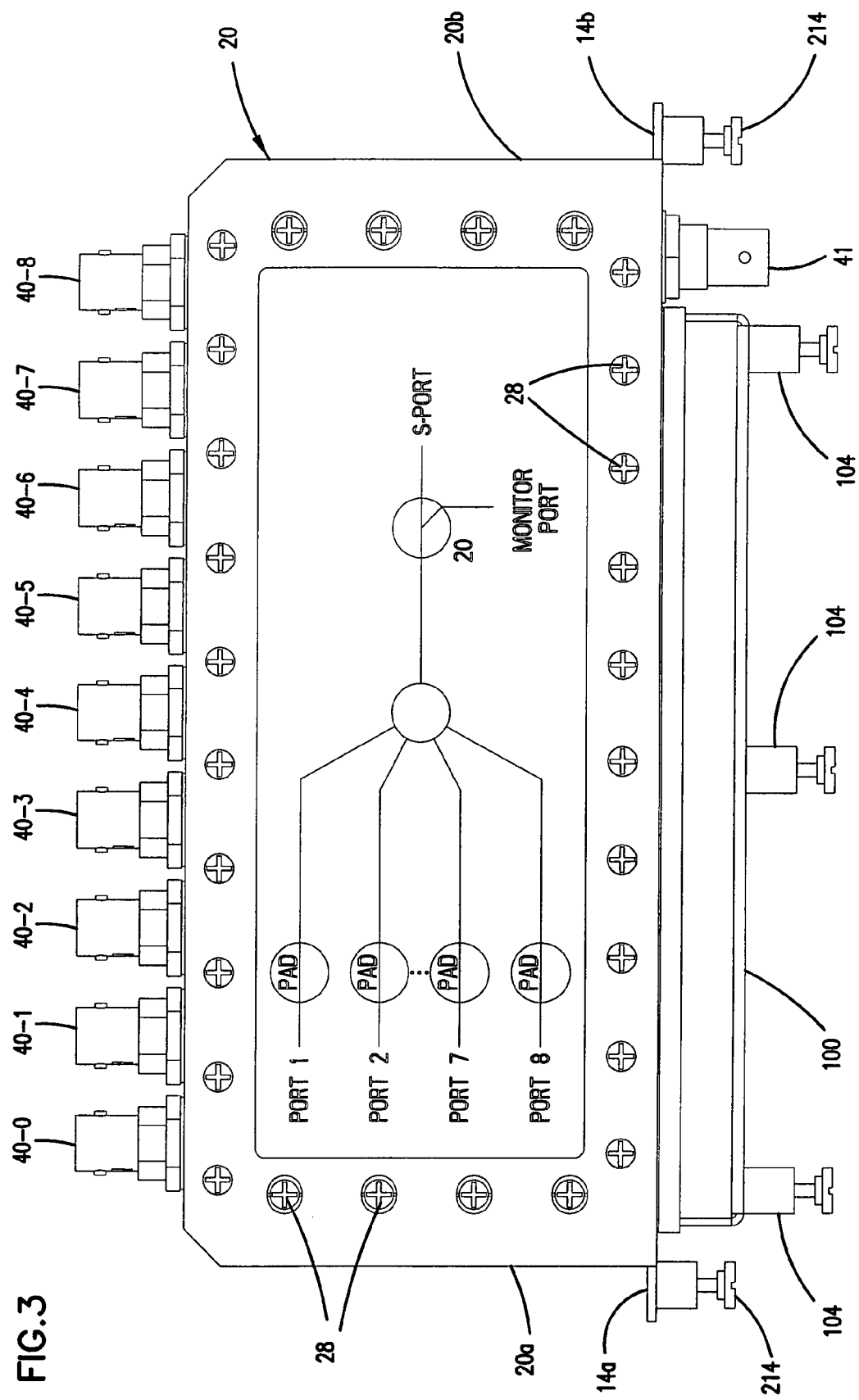
FIG. 3 is a right side plan view of the module of FIG. 1.
Figure 4:
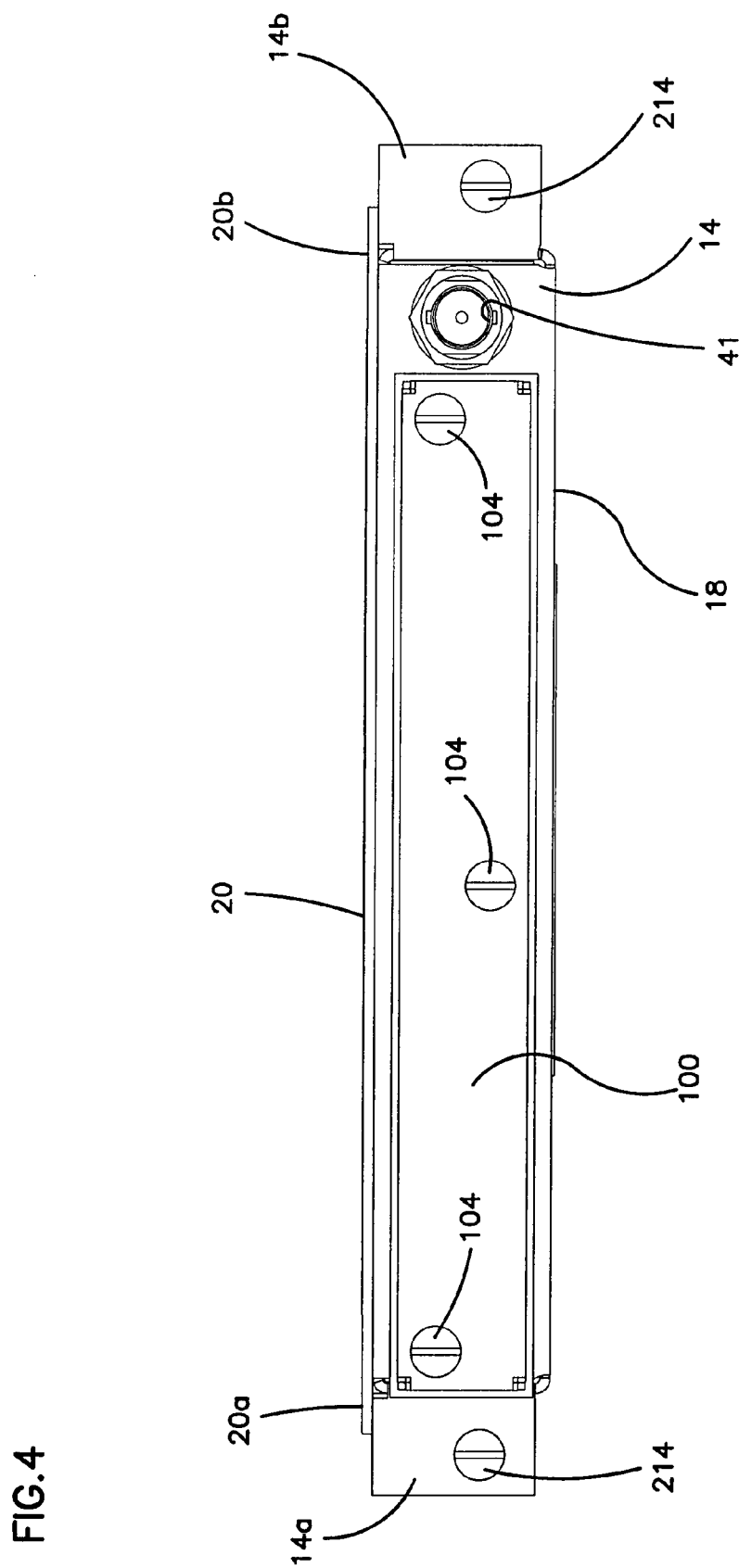
FIG. 4 is a front elevation view of the module of FIG. 1.
Figure 5:
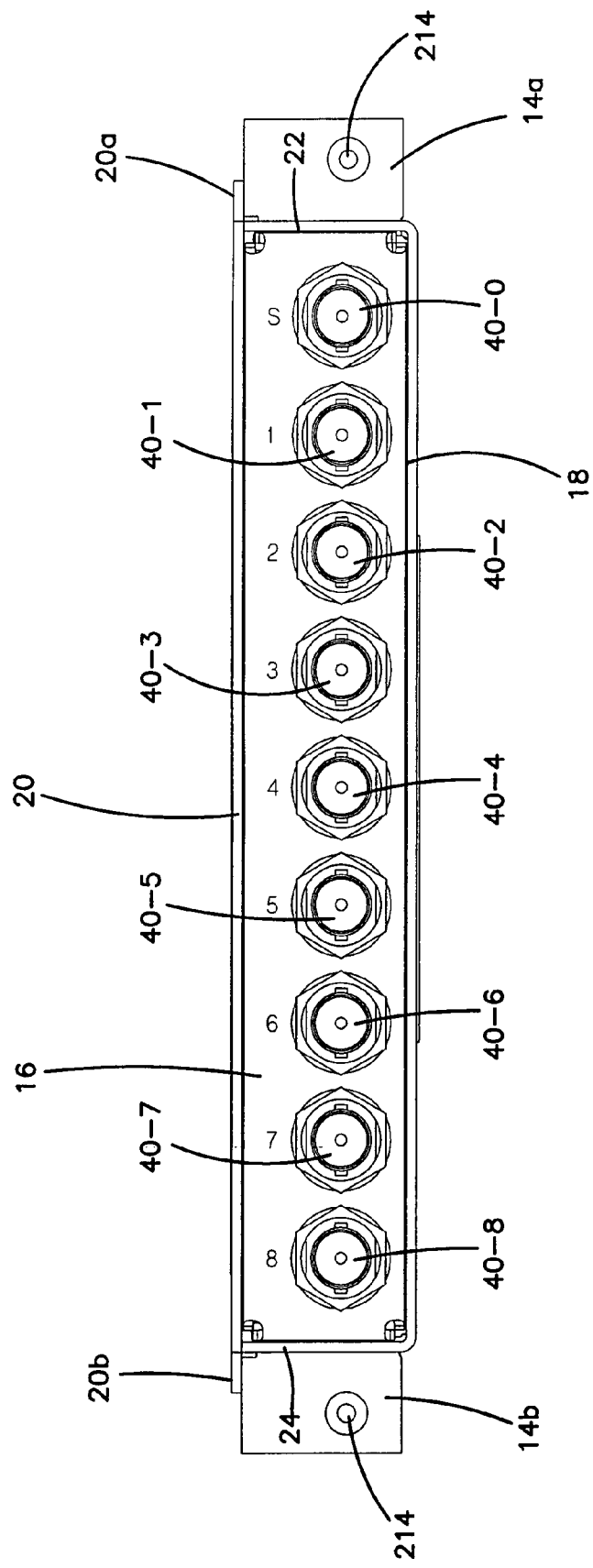
FIG. 5 is a rear elevation view of the module of FIG. 1.
Figure 6:
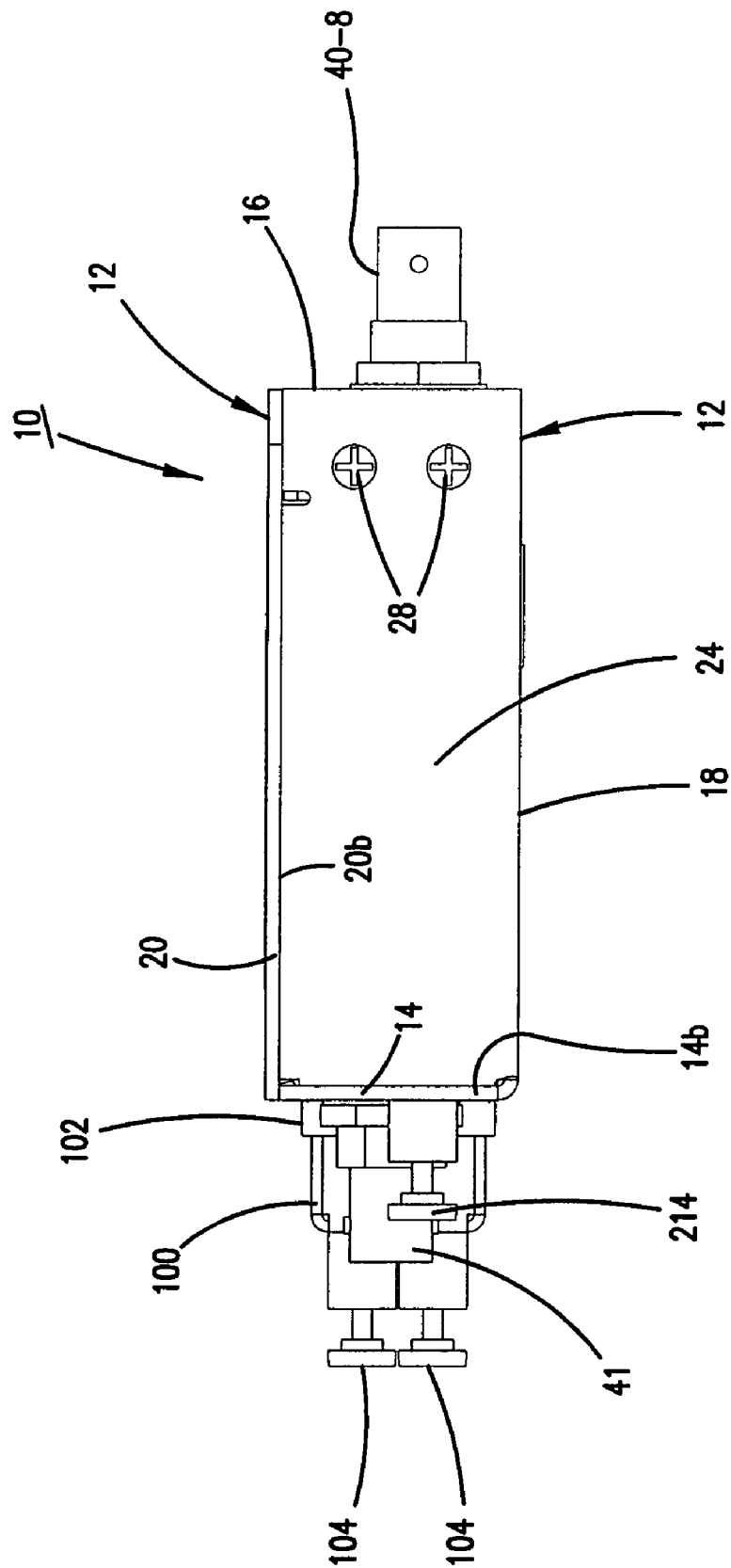
FIG. 6 is a bottom end view of the module of FIG. 1.
Figure 7:
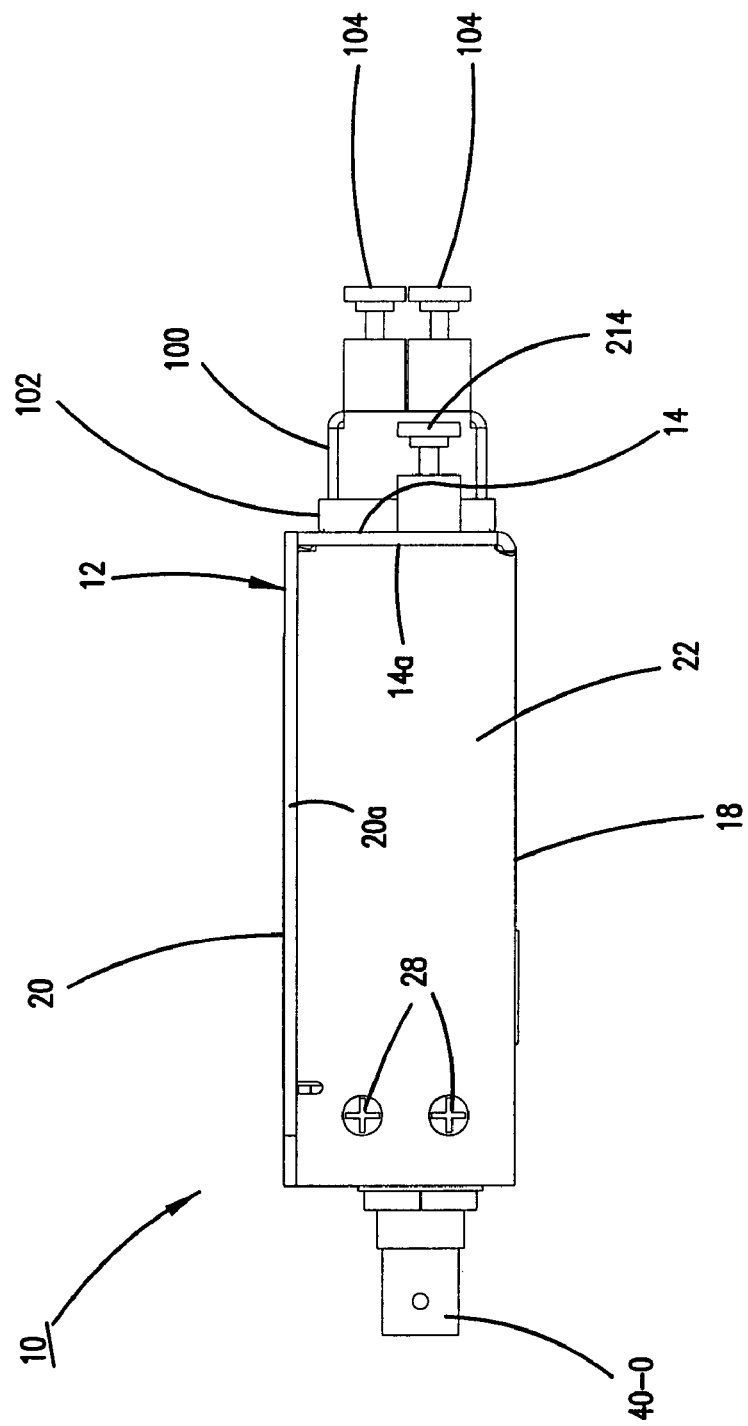
FIG. 7 is a top end view of the module of FIG. 1.
Figure 8:
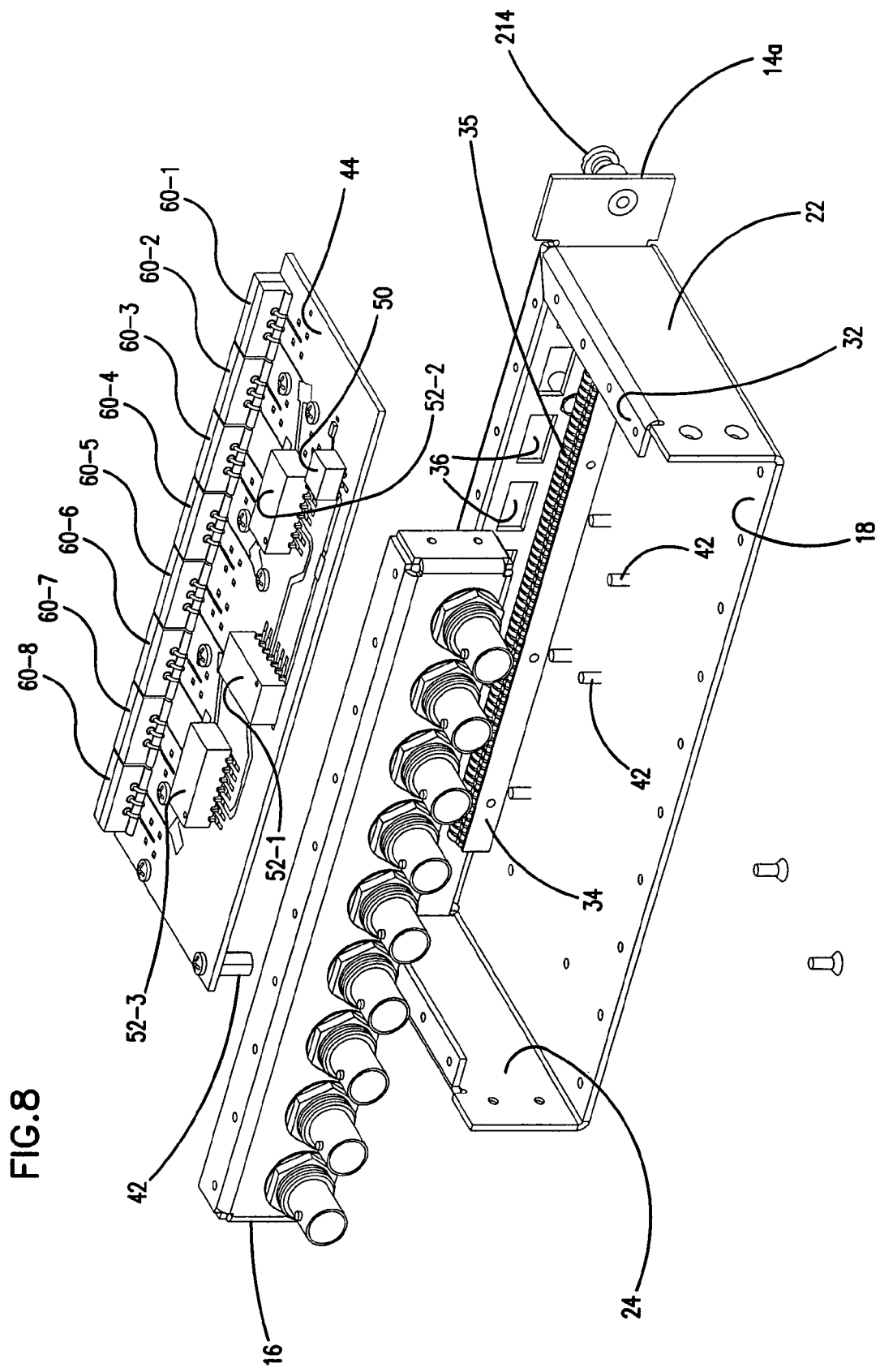
FIG. 8 is a rear, right side and top end exploded view of the module of FIG. 1 with a cover removed.

Referring now to the several drawing figures in which identical elements are numbered identically throughout, a description of the preferred embodiment of the present invention will now be provided.

With initial reference to FIGS. 1 through 11, a module 10 according to the present invention will be described for use as a splitter/combiner module for splitting a main signal into a plurality of branch signals or, alternatively, combining a plurality of branch signals into a common main signal. The module 10 includes a housing having a front face 14, a rear face 16. The front face and rear face 14, 16 are separated by opposing sidewalls 18, 20 and opposite end walls 22, 24. The housing 12 is formed of electrically conductive material. Preferably, the material is nickel-plated aluminum.

Sidewall 18 and end walls 22, 24 are integrally formed as a box configuration with walls 22, 24 having inwardly protruding peripheral ledge 26. Rear wall 16 is secured to walls 18, 22, 24 by screws 28. The sidewall 20 is fastened to the ledge 26 by a plurality of screws 28 received in aligned bolt holes 30 of sidewall 20 and threaded bolt holes 32 on the peripheral ledge.

The sidewall 20 is sized to have a length greater than the longitudinal dimension between walls 22, 24 such that ends 20a, 20b extend beyond ends 22, 24 as flanges for purposes that will be described.

The front cover 14 includes extending edges 14a, 14b which extend beyond ends 22, 24. The front cover further has an internal ledge 34 (shown in FIGS. 1, 8 and 11) on an interior surface of the cover 14. The ledge 34 is sized to extend into the interior of the housing when the front cover 14 is attached to the housing.

The front cover 14 and sidewall 20 are secured to the housing by the screws 28 received within aligned bolt holes. The screws 28 are preferably positioned at one-half inch on-center spacings to prevent EMI leakage as is conventional.

The front cover 14 includes a plurality of openings 36 the function of which will be described with the openings 36 arranged linearly along the face 14. Similarly, the front cover 14 includes an opening 38 sized to pass a coax connector 41 for purposes that will become apparent.

A plurality of coax connectors 40-0 through 40-8 are secured to the rear face 16. Each of the coax connectors is identical. Such connectors are conventional and include a central conductor surrounded by a grounded shield. The grounded shields of the coax conductors are in direct physical and electrical contact with the electrically conductive material of the rear face 16.

Contained within the interior of the housing 12 is a printed circuit board 44. The printed circuit board 44 is supported on posts 42 by screws 43. The posts 42 are electrically conductive and connected to wall 18. The printed circuit board 44 includes a component side 44a and a ground side 44b (see FIG. 9). The ground side 44b opposes the wall 18 and the component side 44a opposes wall 20. The printed circuit board 44 is maintained in parallel, spaced relation between the walls 18, 20 by supports 42.

A layer 44c (FIG. 9) of electrically conductive material (such as a sheet layer of copper) is provided on the exterior surface of surface 44b.

A plurality of coax cable connection locations 48-0 through 48-8 are provided on the ground side 44b of the printed circuit board 44. Each of the coax cable connection locations 48-0 through 48-8 include a ground connection for connecting the ground shields of a coax cable to the conductive layer 44c.

A plurality of circuit components are disposed on the component side 44a of the printed circuit board 44. In the embodiment shown, the components include a solid state directional coupler 50 and three solid state splitter/combiners 52-1, 52-2 and 52-3.

It will be appreciated that a solid state directional coupler 50 is a commercially available item, and an example of such is a 20 dB coupler Product No. CPL/20BE-08A3 sold by TRAK Microwave, 4726 Eisenhower Blvd., Tampa, Fla. 33634-6391. Similarly, solid state splitter/combiners 52-2 through 52-3 are commercially available one-by-four splitters and examples of such are Product No. SPL/4BE-53D sold by TRAK Microwave. Splitter/combiner 52-1 is a one-by-two splitter such as Product No. SPL/2BE-53D of TRAK Microwave.

The splitter/combiners each receive a signal and divide an RF signal into two signals of equal strength. Splitter/combiners 52-2 and 52-1 are electrically connected in series. Similarly, splitter 52-3 is connected in series with splitter 52-1 such that splitter 52-3 is connected in parallel to splitter 52-2.

Figure 9:
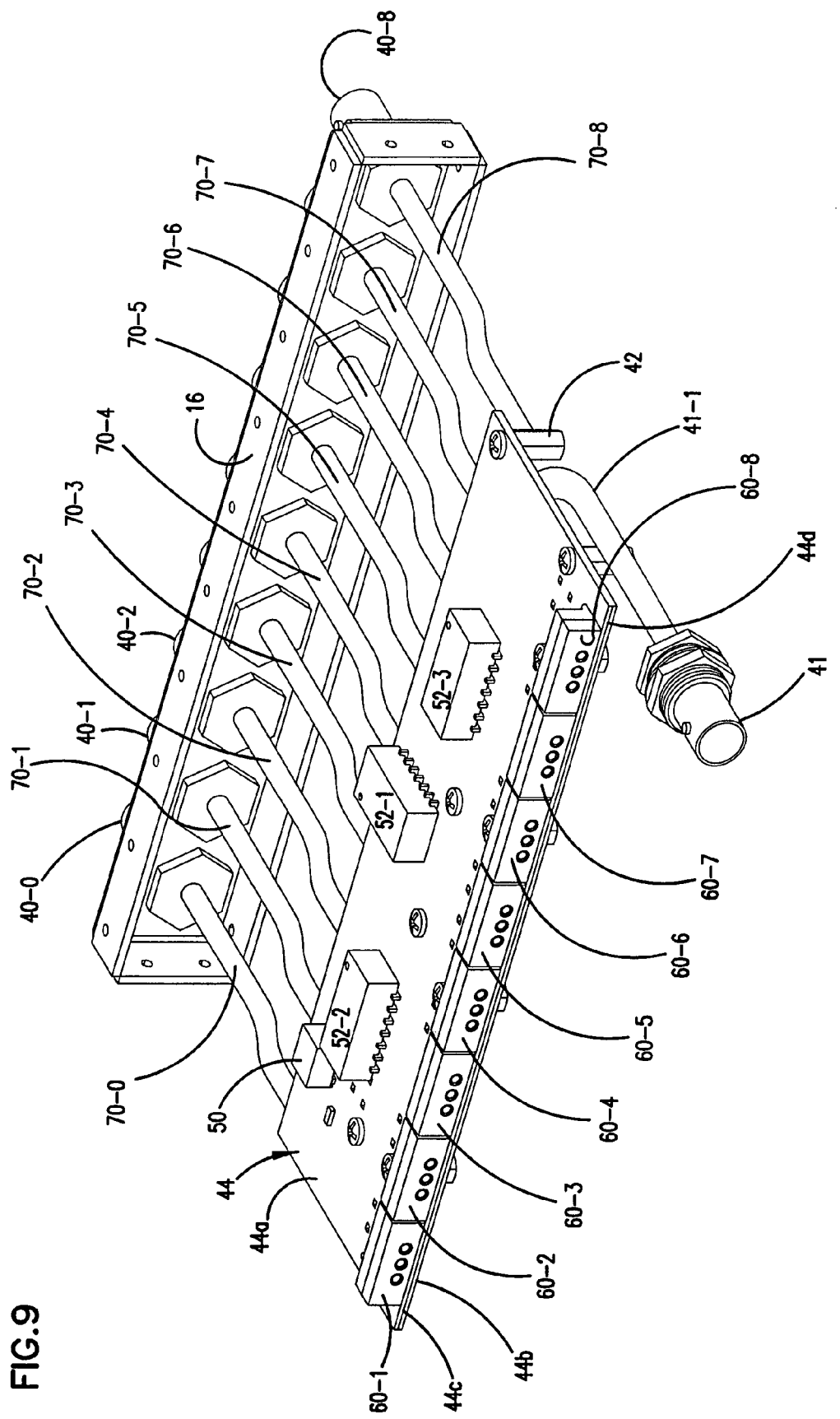
FIG. 9 is a perspective view of internal components of the module of FIG. 1.
Figure 9A:
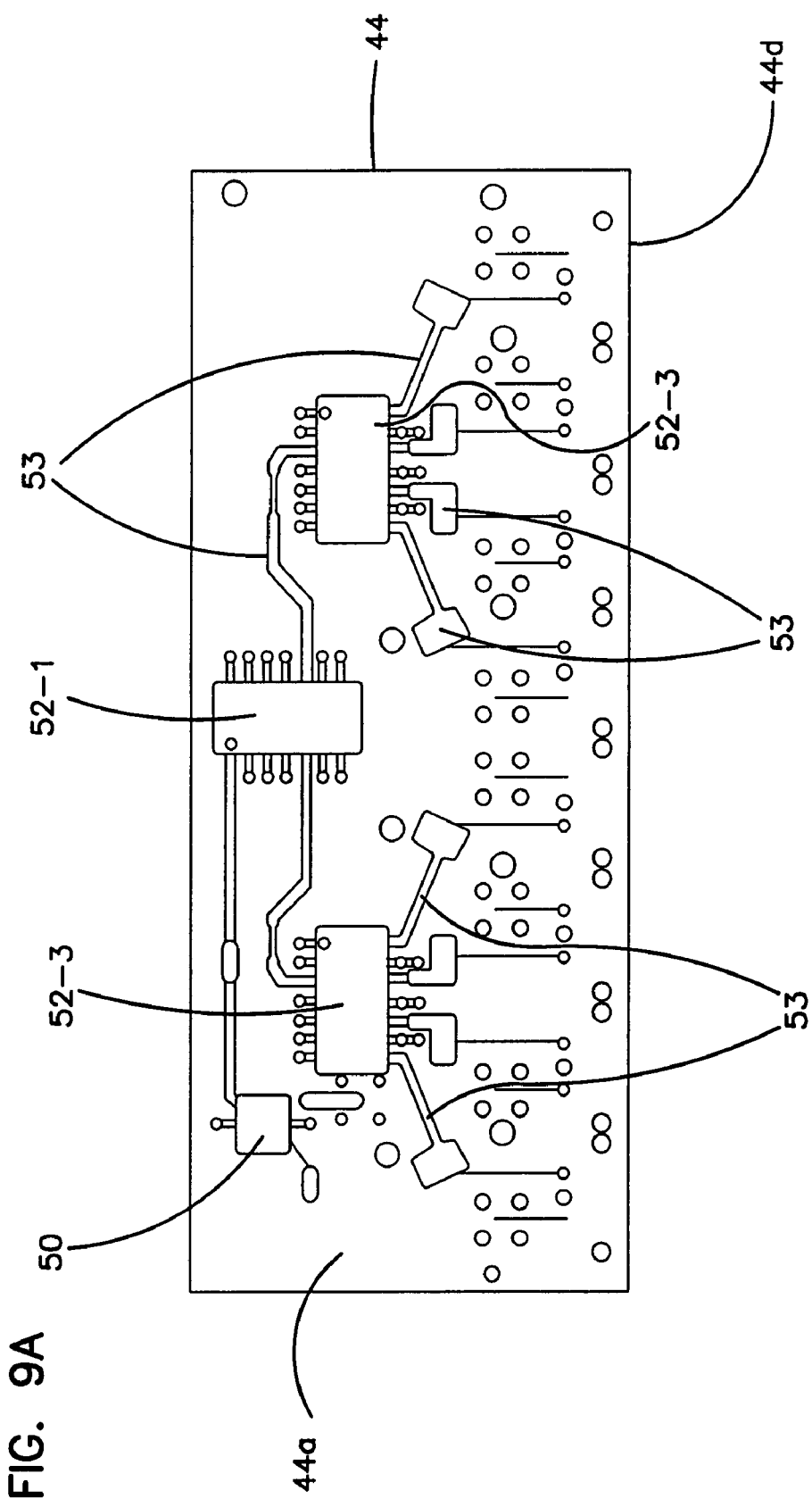
FIG. 9A is a top plan view of a printed circuit board and attached components.
Figure 10:
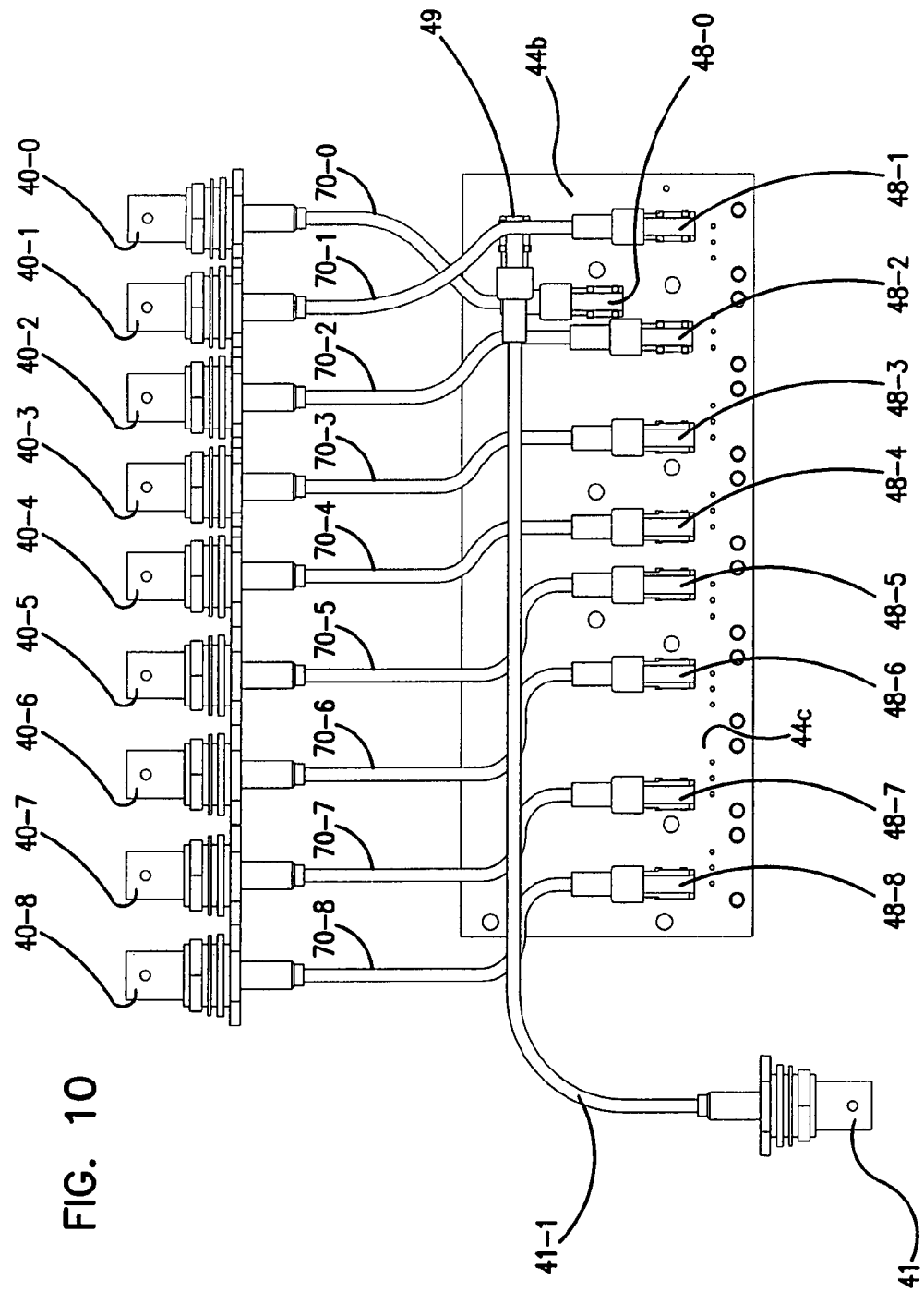
FIG. 10 is an opposite side plan view of the components of FIG. 9.
Figure 11:
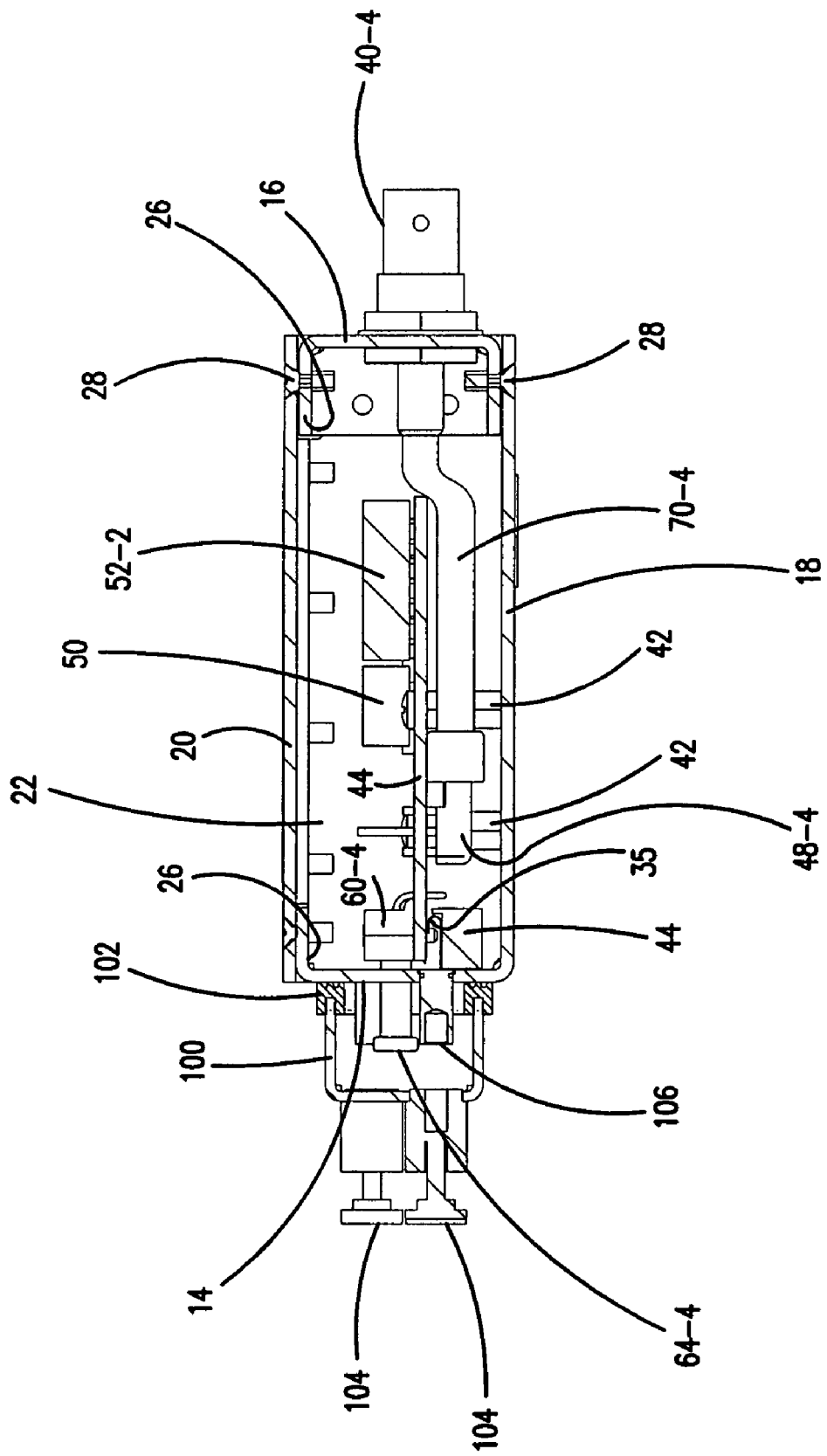
FIG. 11 is a side cross-sectional view of the module of FIG. 1.

The electrical connection of the components 50 and 52-1 through 52-3 is provided through a plurality of circuit paths 53 (FIG. 9A) contained on the surface 44a where the circuit paths connect the components 50, 52-1 and 52-3 with the coax connection locations 48-0 through 48-8. The circuit paths connect the components and the connection locations such that connectors 40-0 is connected to the directional coupler 50 with a portion of the signal diverted from the directional coupler 50 to the coax monitor connector 41 through cable 41-1. Preferably, coupler 50 provides a −20 dB monitor signal.

The main signal from the directional coupler 50 is passed to the splitter/combiner 52-1 which divides the main signal into two signals with one passed along the circuit paths to splitter/combiner 52-2 and the other passed to splitter/combiner 52-3. Each of splitters 52-2 and 52-3 split a signal into four signals resulting in a total of eight branch signals passed to connection locations 48-1 through 48-8.

In the preceding paragraph, a signal is described as coming into the directional coupler from connector 40-0 and then eventually split and passed to connectors 40-1 through 40-8. With the directional coupler 50 arranged in the schematic shown of FIG. 3, such a signal flow path would result in losing a monitor function at monitor port 41. With this schematic shown in FIG. 3, signals passed into connectors 40-1 through 40-8 are attenuated and combined to a main signal which is then passed through directional coupler 50 to OUT port 40-0. A portion of the main signal is then passed from the directional coupler 50 to the monitor port 41 so that the signal may be monitored. If it is desirable to pass a signal into connector 40-1 for division into branch signals distributed to connectors 40-1 through 40-8, a different directional coupler 50 can be provided such that a signal from connector 40-0 can be monitored at port 41.

Before the branch signals are passed to the connection locations, they are passed through attenuator components. Each of the attenuator components is identical and includes a base member 60-1 through 60-8 which is secured to the component side 44*a* of the printed circuit board 44 along a leading edge 44*d* of the printed circuit board and with the base members 60-1 through 60-8 arranged in a linear array.

A plurality of the attenuator plugs 64-1 through 64-8 are provided to be releasably connected to individual ones of the base member 60-1 through 60-8. The attenuator plugs 64-1 through 64-8 provide an attenuation to a signal to each of the branch circuits being sent to connectors 40-1 through connectors 40-8.

Attenuator plugs and base members are commercially available items such as those sold as Product No. F-7520-A (for a 20 dB attenuator) through Communication Associates 1750 T-'Coleman Road, Anniston, Ala. 36207. The plugs 64-1-64-8 can be individually selected to provide a discrete amount of attenuation to a signal. For example, a "zero" plug can be inserted into a base member to provide 0 dB attenuation. Alternatively, at an option of a technician, the 0 dB plug may be replaced with a 15 dB plug to provide 15 dB attenuation to a signal. As a result, each of the branch circuits can be individually provided with a unique attenuation selected at an option of a technician. The holes 36 on the front face 14 are arranged and sized such that each of the attenuator plugs extends through individual ones of the holes 36 to be grasped by an operator. As a result, an operator can remove and replace an attenuator plug without needing access to the interior of the housing 12.

To provide EMI leakage protection, the front face 14 is provided with a removable cover 100 surrounding the array of holes 36. A deformable, conductive seal 102 (silicon gasket impregnated with silver particles) is provided between the cover 100 and face 14. Threaded connections 104 on the cover 100 are aligned with threaded holes on the standoff posts 106 such that the cover 100 can be secured to the face 14 by turning the threaded connectors 104 into the standoff posts 106. As the threaded connection 104 is tightened, the edge of the cover 100 compresses into the seal 102 to thereby compress the seal 102 against the face 14 to provide an effective EMI seal.

The device thus described performs splitter/combiner functions with connector 40-0 being a main connector and with connectors 40-1 through 40-8 being branch connectors. In other words, a signal admitted to connector 40-0 is split into eight equal signals passed to connectors 40-1 through 40-8. Further, the main signal may be monitored through forward connector 41.

As shown in the drawings, all of the connectors 40-0-40-8 are connected to the connection locations 48-0-48-8 via coaxial cables 70-0 through 70-8 such that the ground shield of the coaxial cable is electrically connected to the ground shield of the connectors 40-0 through 40-8, respectively, as well as connected to the conductive layer 44*c*.

In RF circuits, impedance matching is critical. The parallel relation of the electrically conductive layer 44*c* to the sidewall 18 of the housing 12 presents a small capacitance. Further, the spaced relation of the circuit paths 53 to the opposite sidewall 20 presents a minute capacitance. Capacitance between the housing and the circuit components are referred to as "parasitic reactances". Further, there is natural capacitance or reactance of components on the circuit board 44. The pathways 53 are tuned to balance the capacitance. The pathways 53 are tuned by adjusting the size of the circuit pathways 53 such that they present an inductance selected to balance the parasitic reactances and the circuit board reactances. It will be appreciated that sizing circuit pathways to present a desired impedance is well known in the art. Also, the cables 70-0 through 70-8 are routed between the ground surface 44*c* of the circuit board 44 and its opposing sidewall 18 of the housing 12. By routing the cables 70-8, 70-8 on this side of the circuit board 44 and avoiding placing the cables adjacent any of the circuit components or circuit pathways, undesirable reactances are avoided.

With the structure thus described, the desired circuit function is attained in a modular format. Further, in addition to impedance matching circuit components, the selection and arrangement of components permits a high performance module with impedance matching throughout and with desired flatness of a signal across the broad band frequency range.

As shown in the drawings, the forward ledge 34 includes a plurality of resilient spring contacts 35 mounted on the ledge 34 and positioned to swipe against the electrically conductive layer 44*c* as the cover 14 is placed on to the housing to insure enhanced electrical contact between the conductive layer 44*c* and the cover 14 so that all elements are grounded when coaxial cables are connected to the rear connectors.

To further protect the signal, the front cover 100 is provided on front end 14 to cover and enclosed all attenuator plugs 64-1-64-8 extending through holes 36. The cover 100 prevents EMI interference which would otherwise occur by uncovered plugs 64 extending through holes 36.

The foregoing discussion with respect to FIGS. 1-11 described an embodiment of the present invention for an RF module having splitter functions and monitor functions. FIGS. 12-18 illustrate the invention in a different embodiment for an equalizer circuit. In an equalizer circuit, an equalizer component is used to provide the same degree of attenuation at the extremes of the RF bandwidth. Elements similarly numbered with respect to the previously described embodiment are numbered similar in FIGS. 12-18 with the addition of an apostrophe to distinguish between the embodiments.

Figure 12:
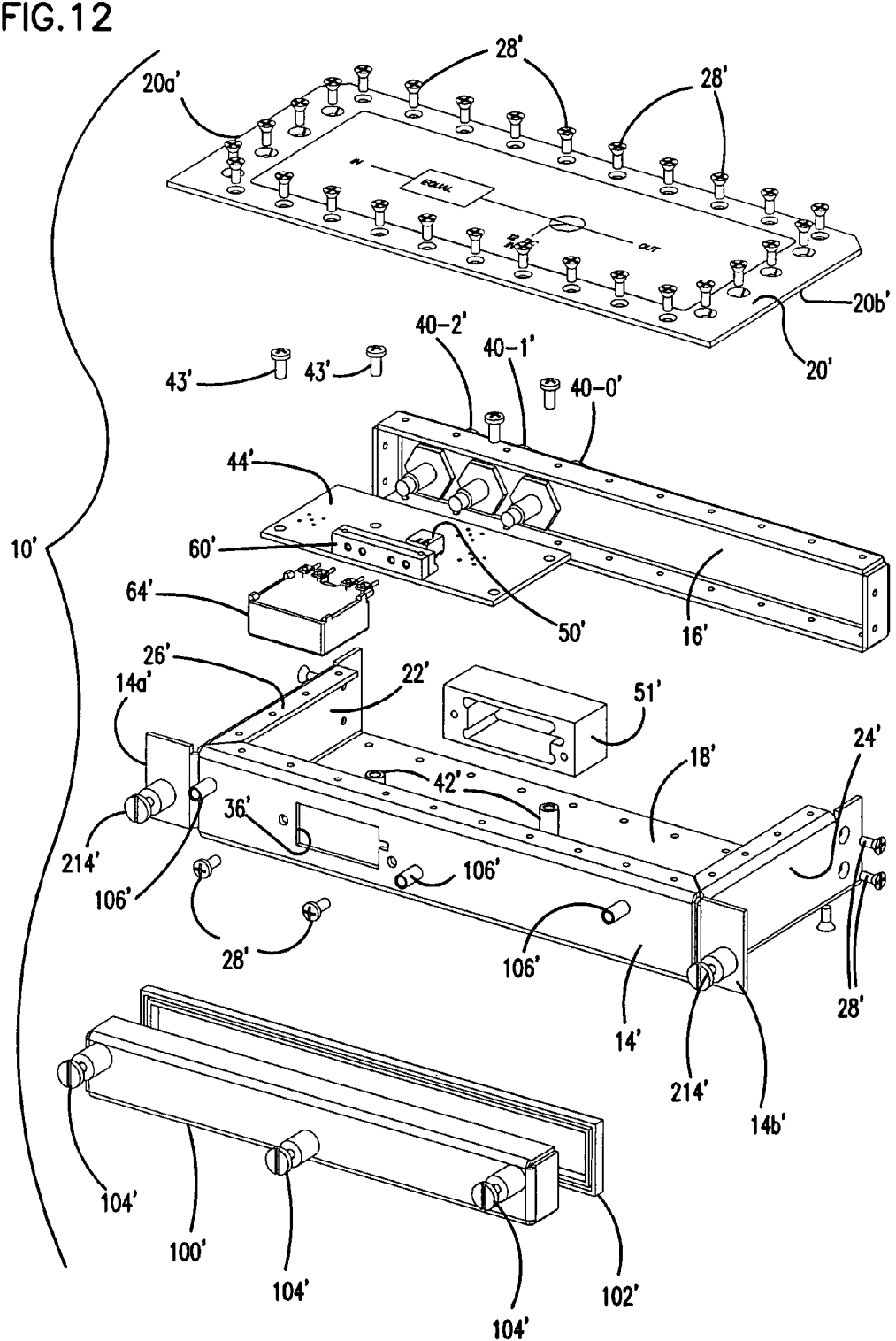
FIG. 12 is a view similar to that of FIG. 1 showing in exploded format an alternative embodiment of the present invention.
Figure 13:
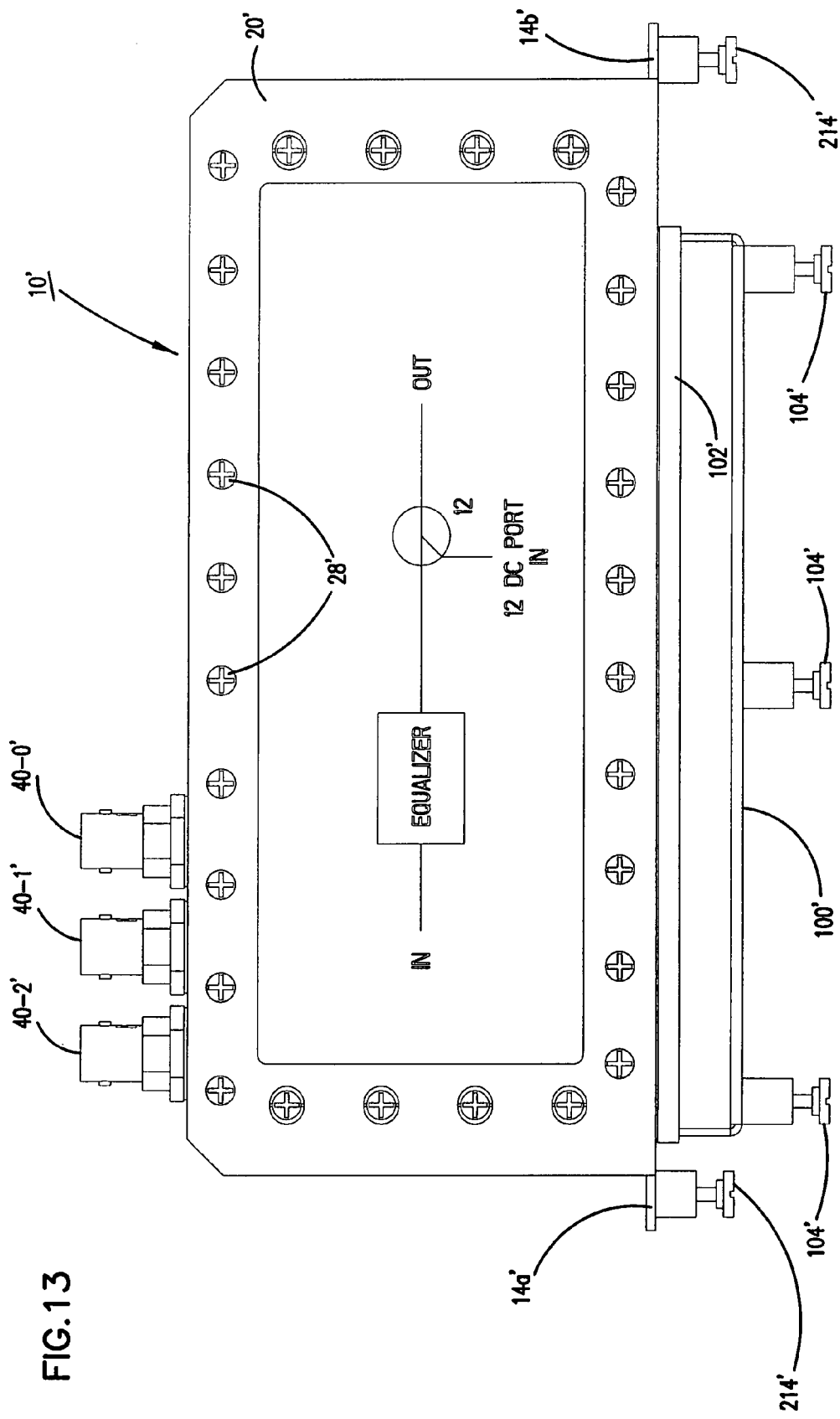
FIG. 13 is a right side plan view of the module of FIG. 12.
Figure 14:
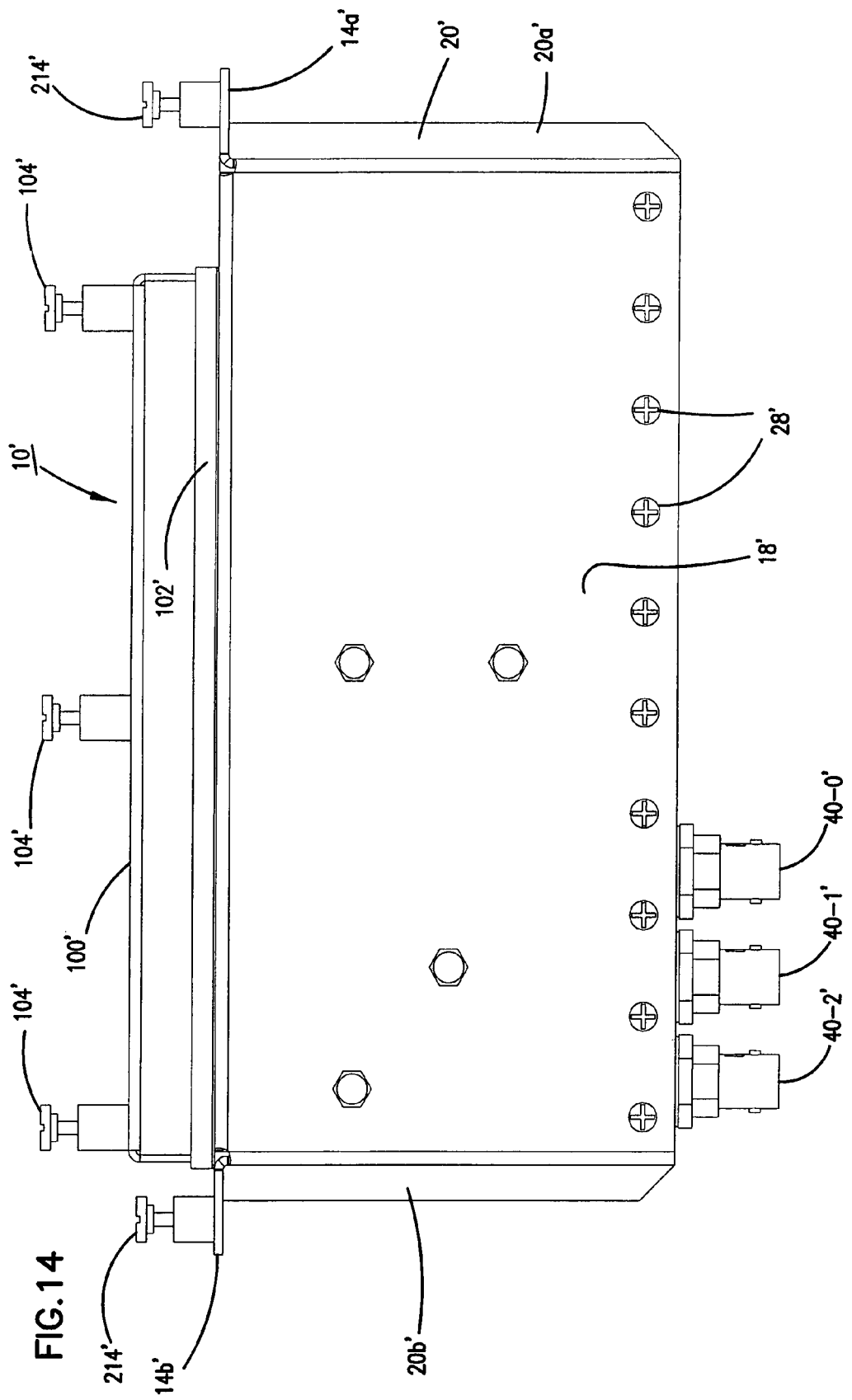
FIG. 14 is a left side plan view of the module of FIG. 12.
Figure 15:
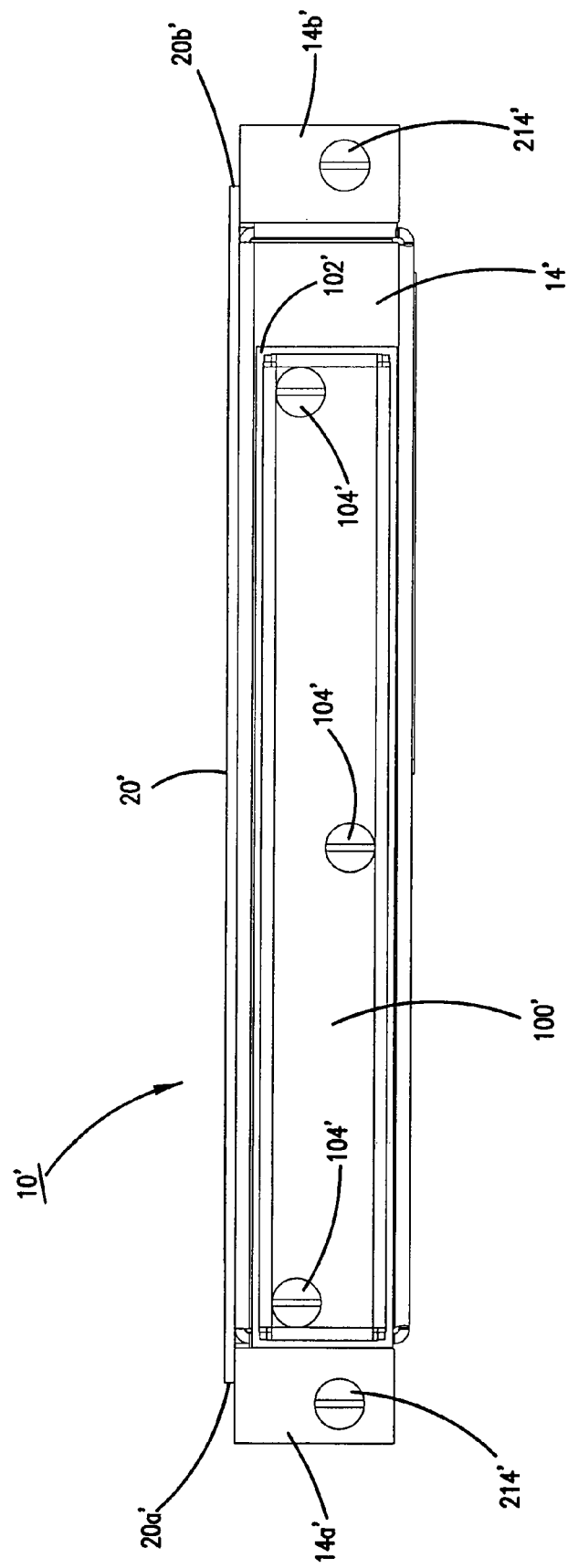
FIG. 15 is a front elevation view of the module of FIG. 12.
Figure 16:
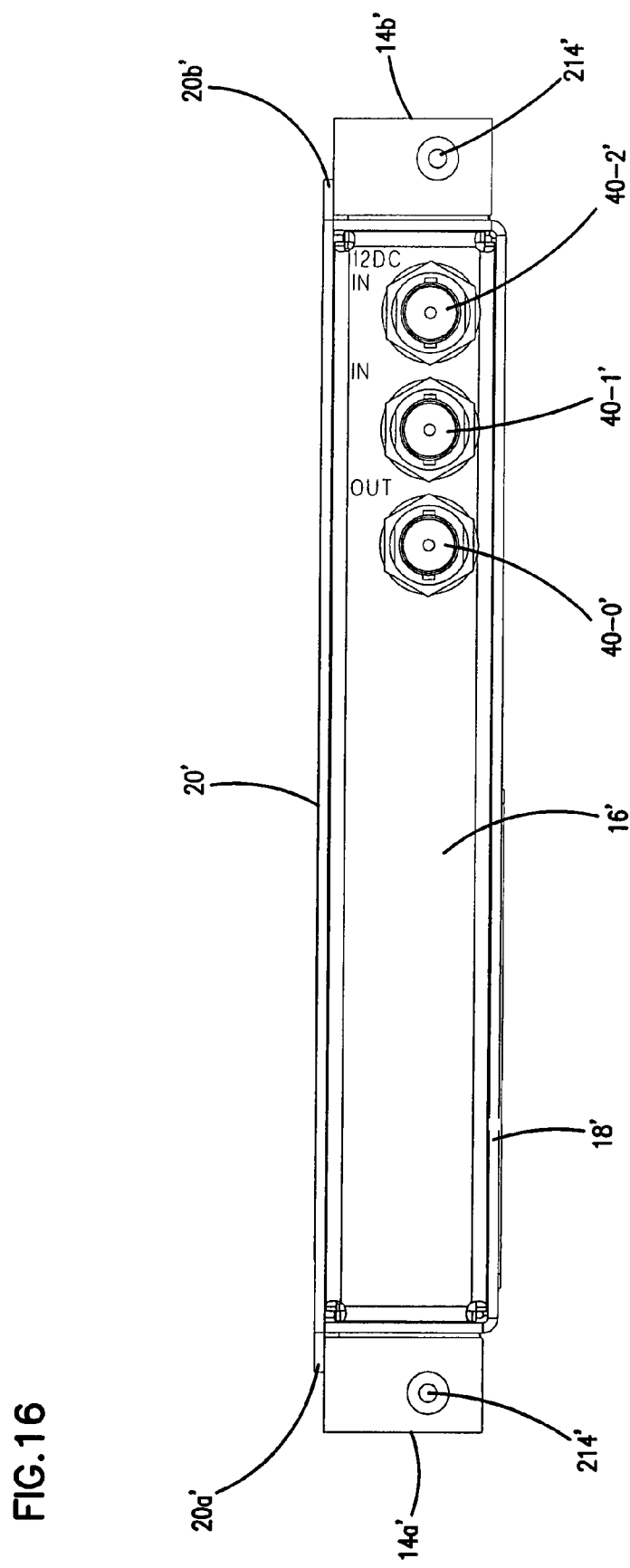
FIG. 16 is a rear elevation view of the module of FIG. 12.
Figure 17:
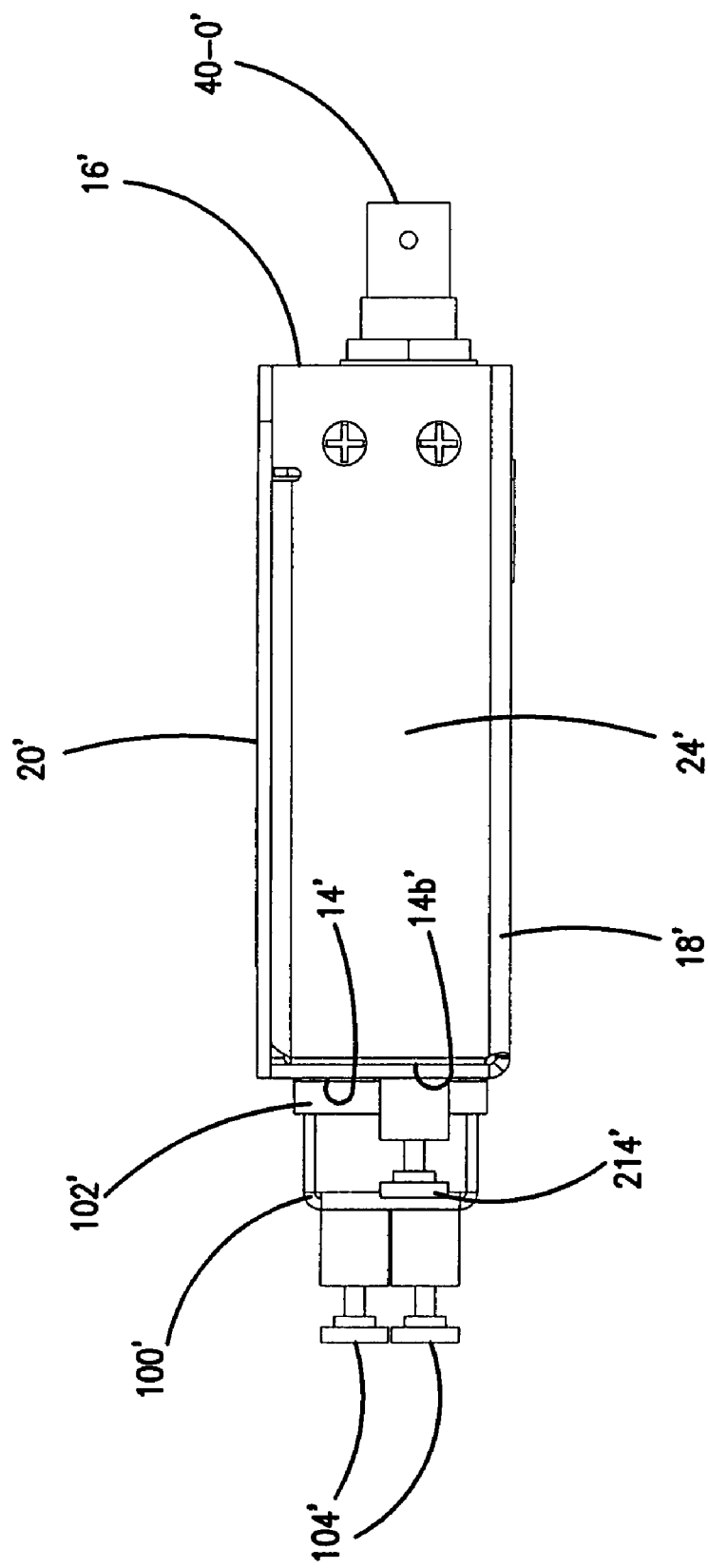
FIG. 17 is a bottom end view of the module of FIG. 12.
Figure 18:
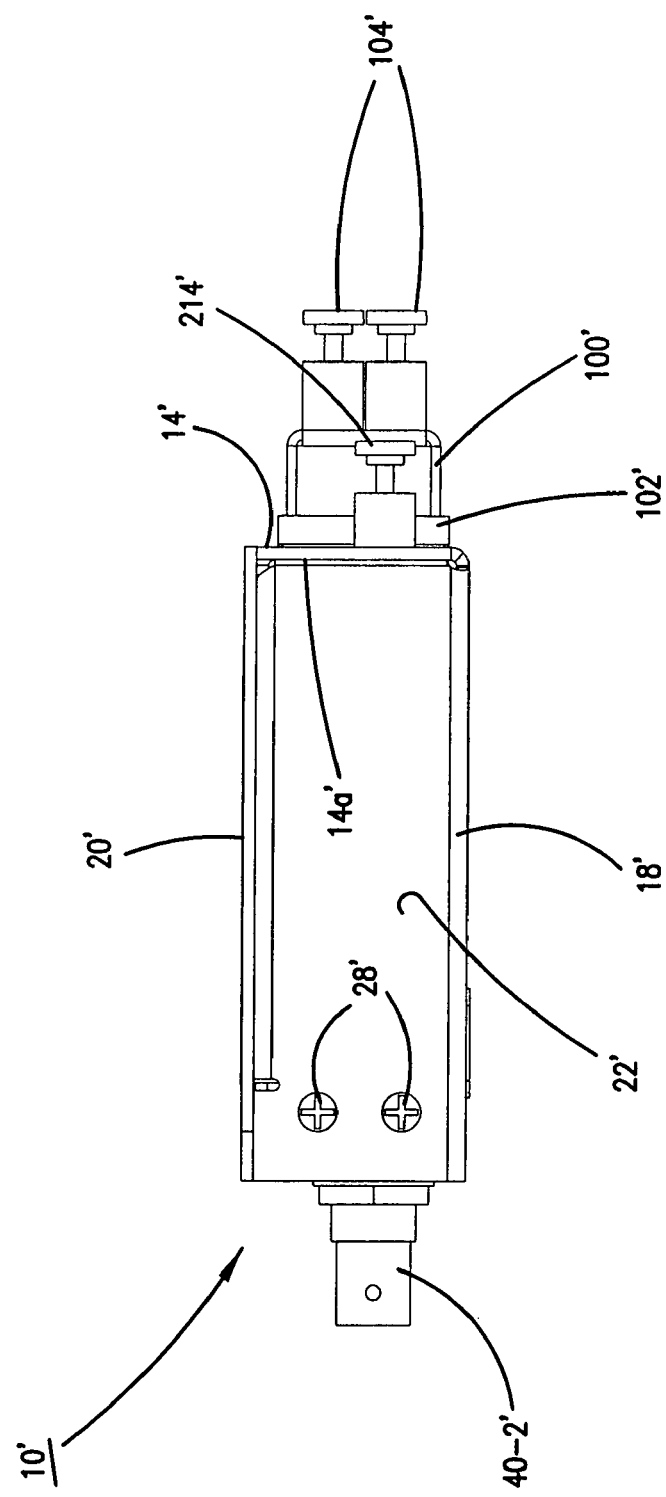
FIG. 18 is a top end view of the module of FIG. 12.
Figure 19:
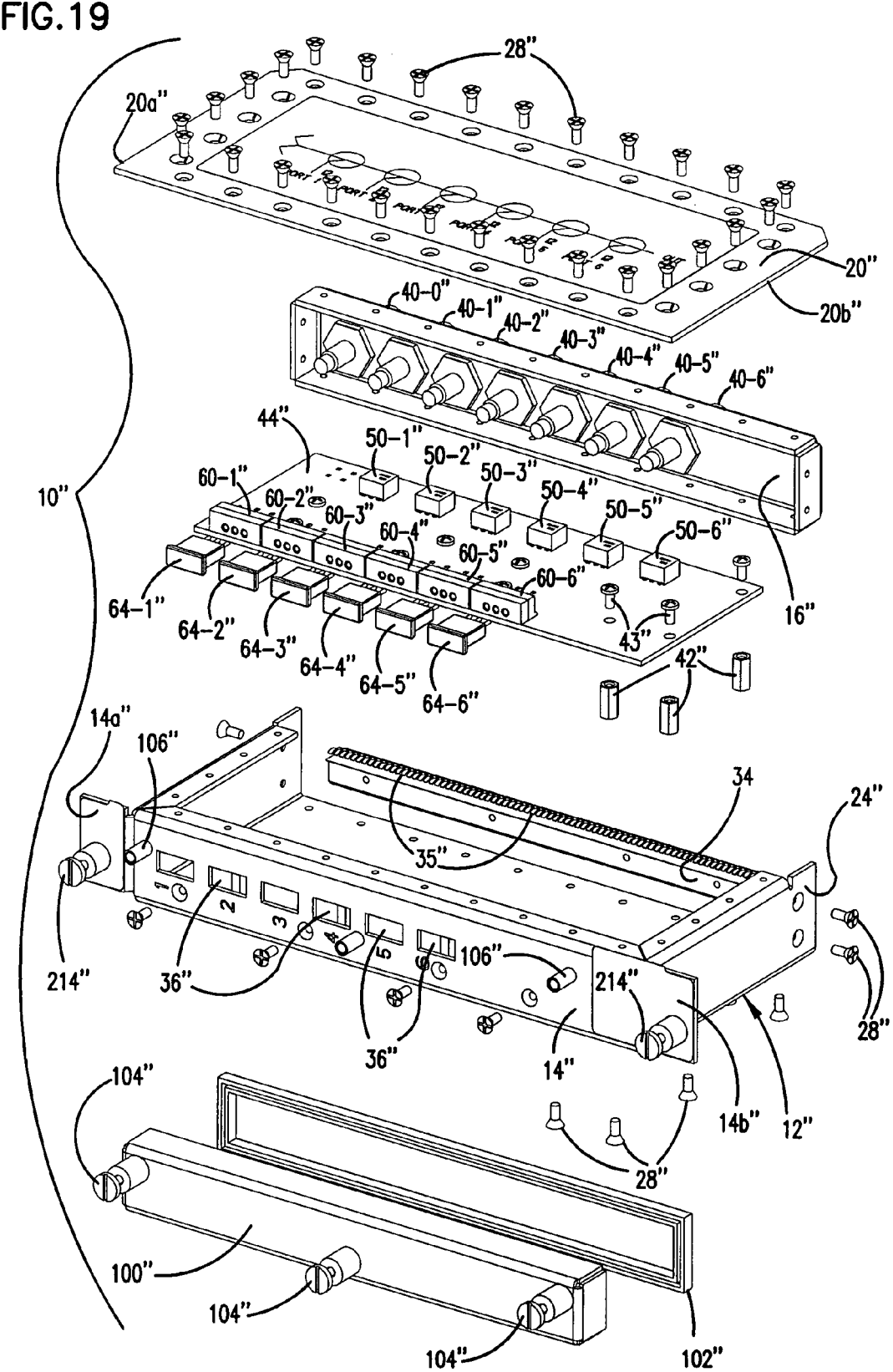
FIG. 19 is a bottom end, front face and right sidewall perspective view of a third embodiment of a module according to the present invention shown in exploded view (with internal cables omitted)
Figure 20:
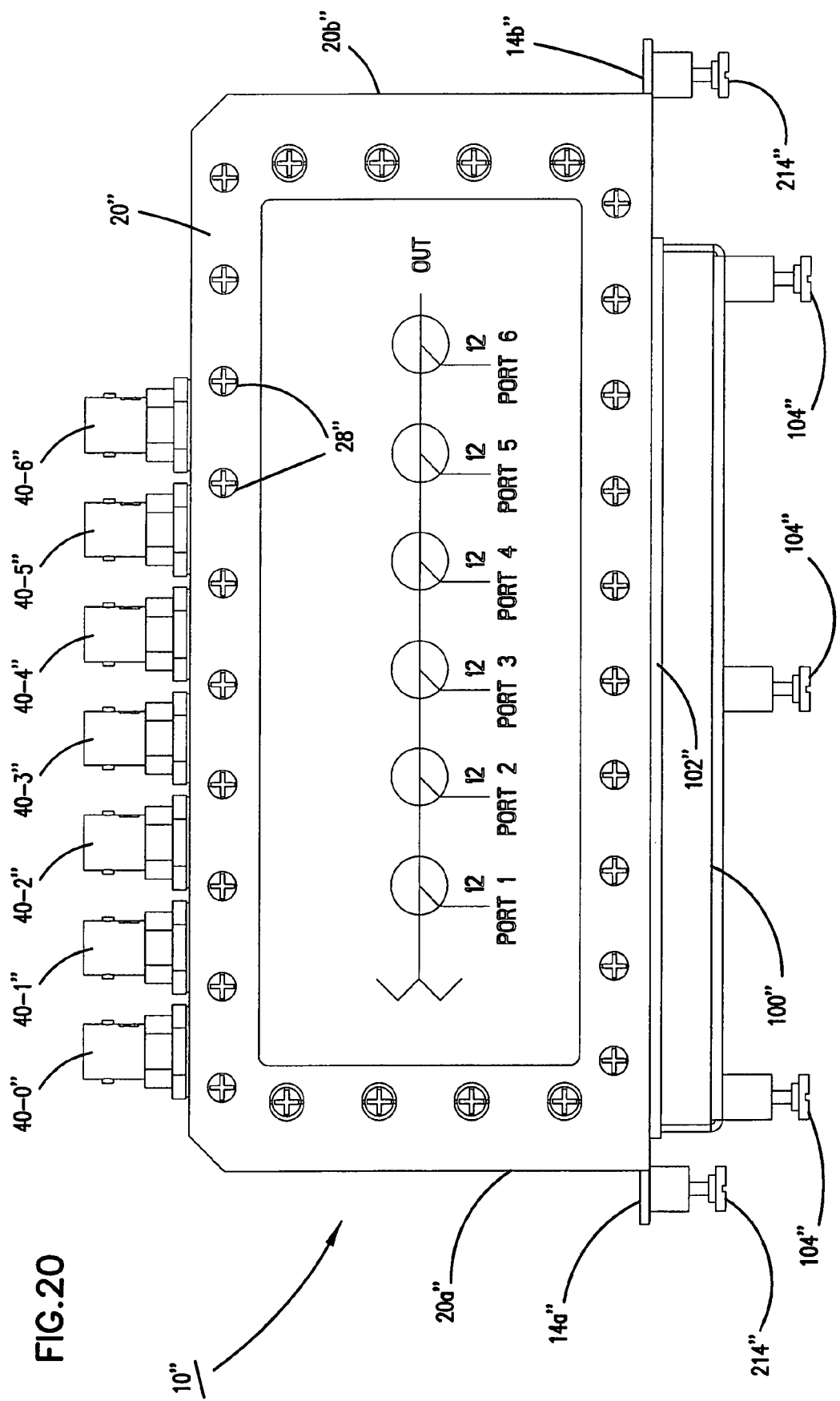
FIG. 20 is a right side plan view of the module of FIG. 19.
Figure 21:
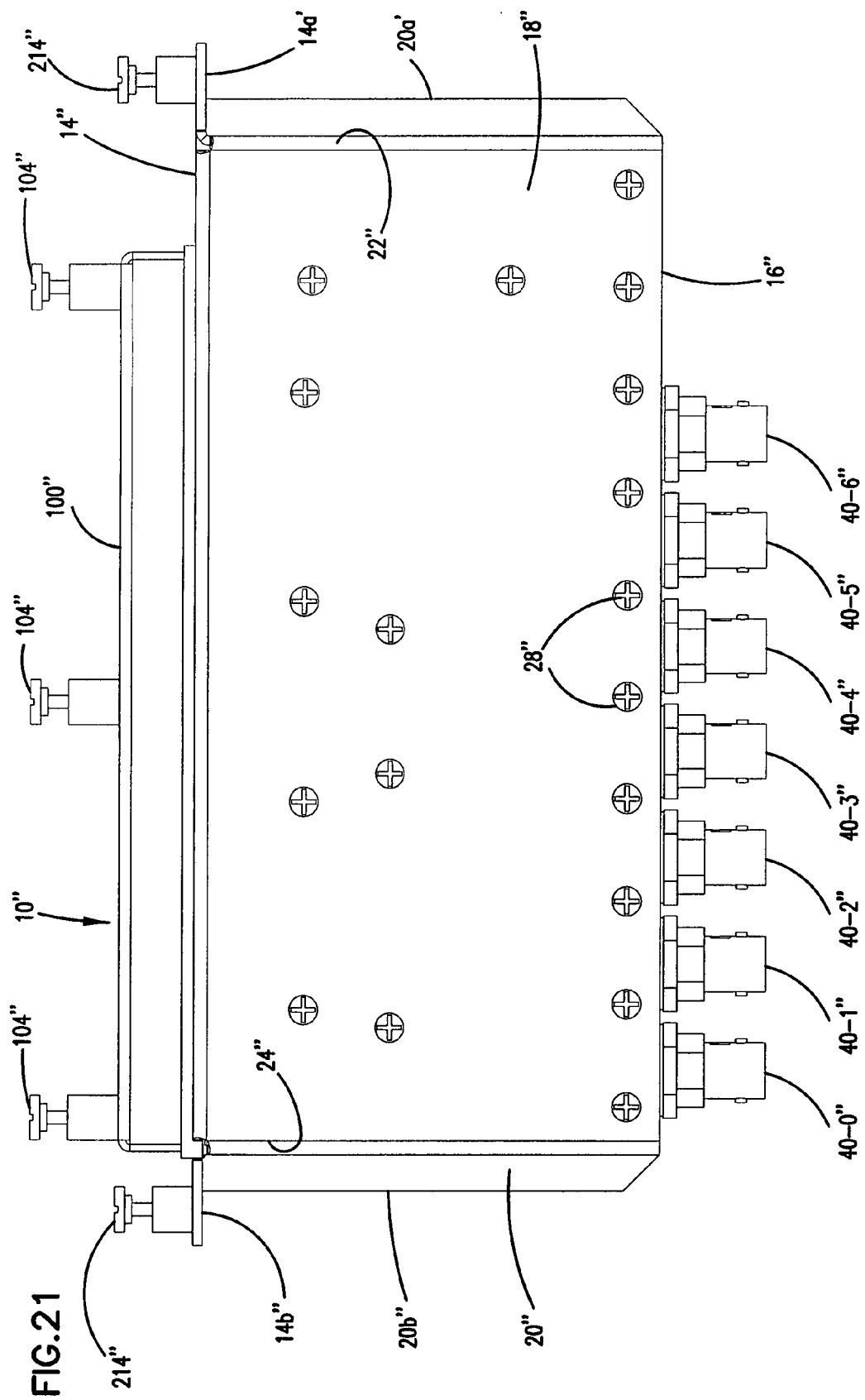
FIG. 21 is a left side plan view of the module of FIG. 19.
Figure 22:
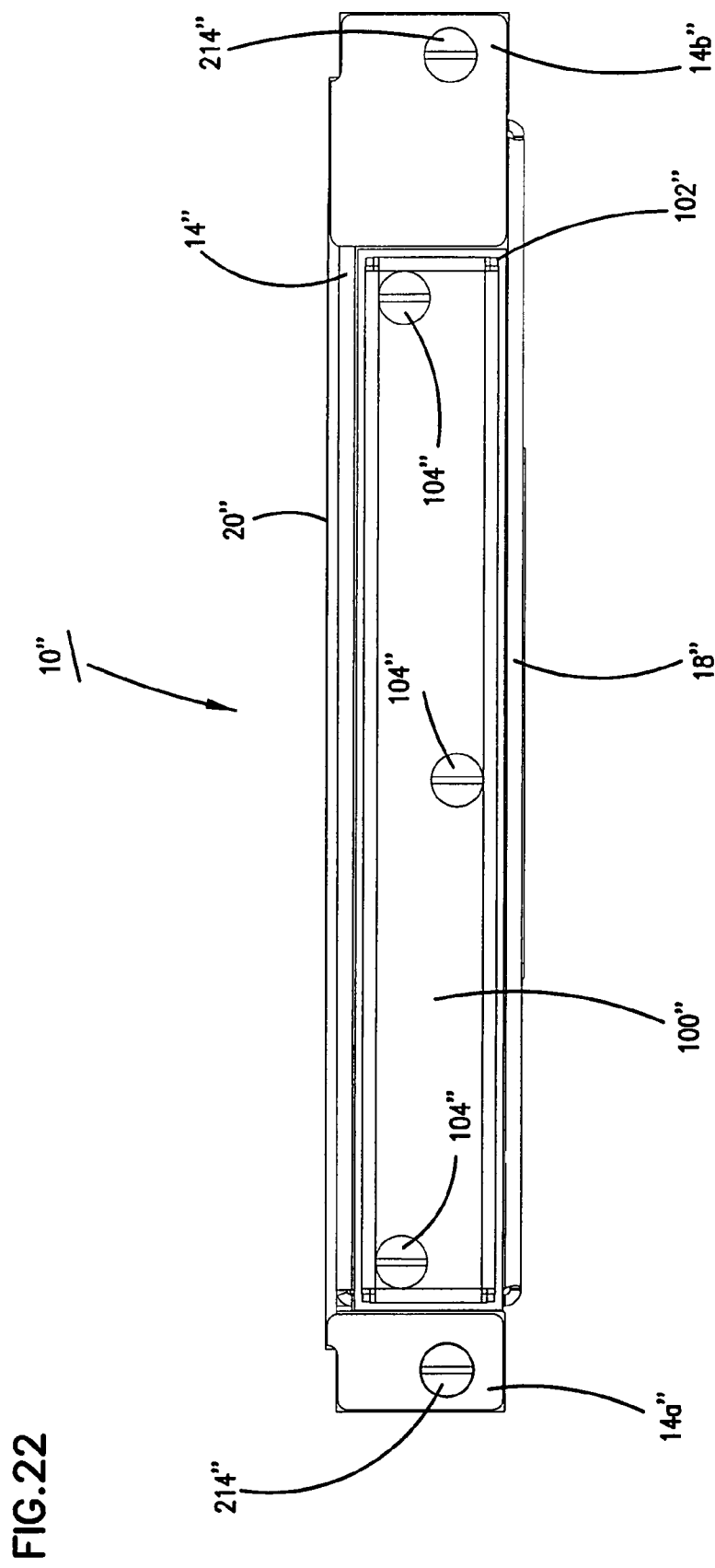
FIG. 22 is a front elevation view of the module of FIG. 19.
Figure 23:
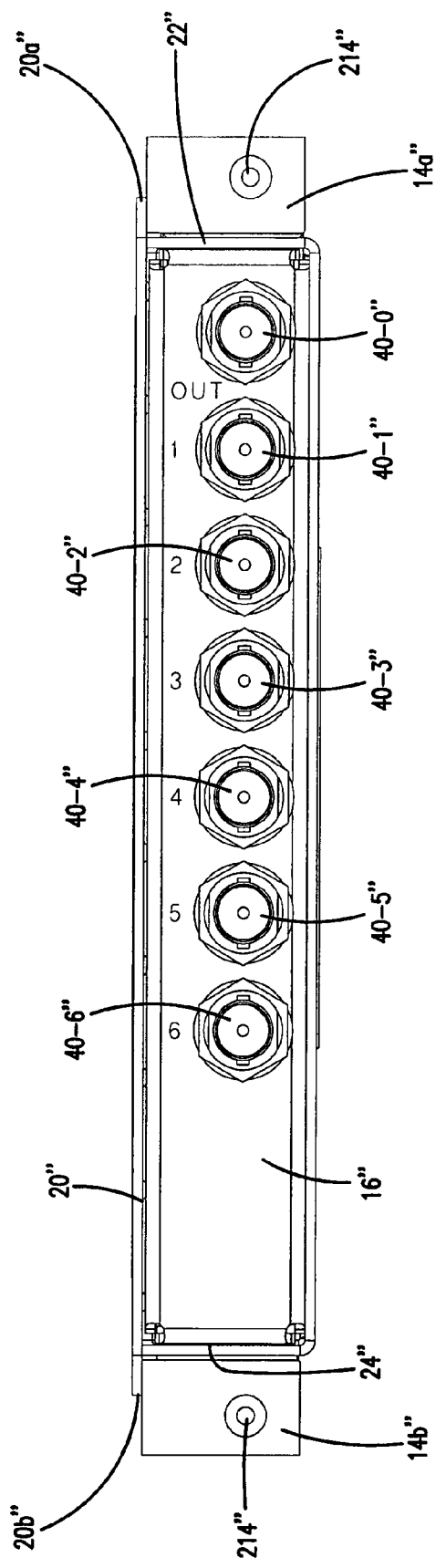
FIG. 23 is a rear elevation view of the module of FIG. 19.
Figure 24:
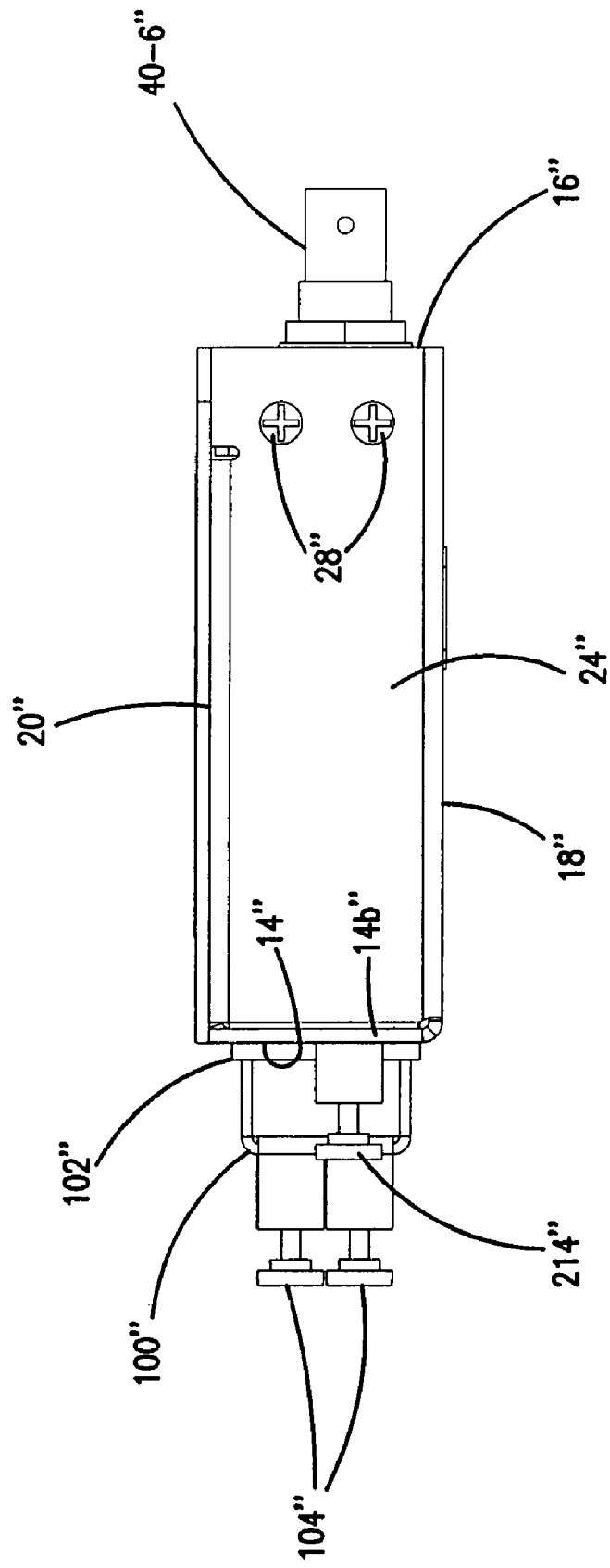
FIG. 24 is a bottom end view of the module of FIG. 19.
Figure 25:
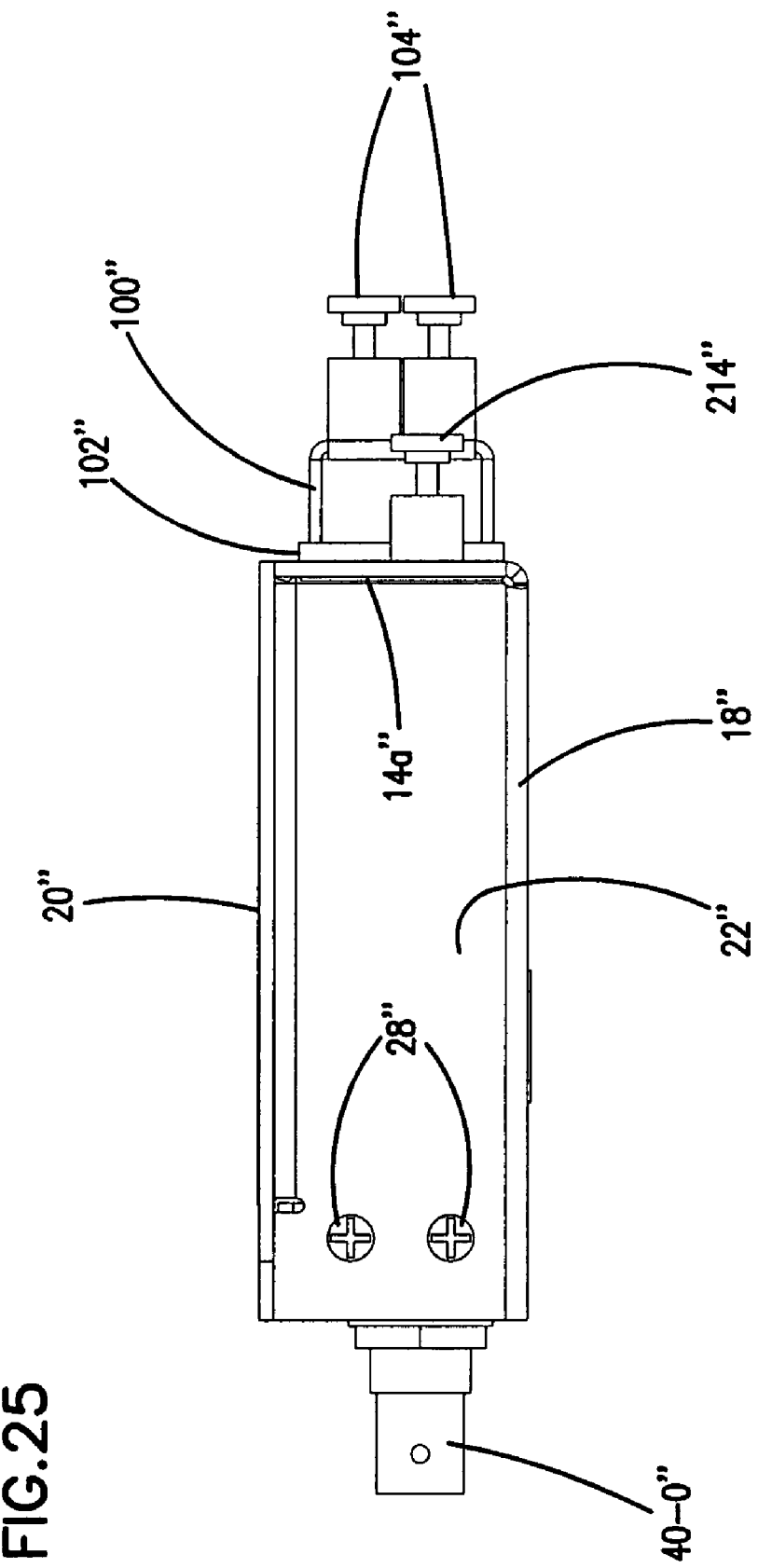
FIG. 25 is a top end view of the module of FIG. 19.

In FIG. 12, a module 10' includes a housing having a base 18' and sidewalls 22', 24'. The module 10' further includes a front face 14' and a rear face 16'. A side cover 20' closes the module 10'.

As in the previously described embodiment, the present invention incorporates a printed circuit board 44' containing circuit components. The circuit board 44' is maintained in parallel spaced relation between the sidewall 20' and the lower sidewall 18' by support posts 42' and associated screws 43'.

For the equalizer circuit, the circuit components include a directional coupler 50' and an equalizer component 64' removably secured to a base member 60'. The equalizer 64' may be removed or replaced through an opening 36' in the forward wall 14'.

The rear wall 16' contains coax connectors 40-0', 40-1' and 40-2'. Coaxial cables (not shown) extend from the coax connectors 40-0' through 40-2' and beneath the printed circuit board 44' in a manner identical with that previously described. Further, as in the previous embodiment, the circuit board 44' contains an electrically conductive layer opposing and electrically connected to surface 18'. Also, the circuit paths on the upper surface of the board 44' are provided to balance impedances as previously described.

The coaxial cables will extend between the board 44' and the surface 18' for reasons previously discussed. The circuit paths on the board 44' are disposed such that an incoming circuit from incoming signal from 40-0' is passed to the equalizer and then to the directional coupler 50'. Further, the separate incoming signal can be passed from connector 40-1' to directional coupler 50' encoupled with the signal from the equalizer 64' with the coupled signal passed to the output connector 40-2'. A support 51' is mounted within the interior of the housing to guide equalizer 64' toward base member 60' in required alignment. As with the previous embodiment, a cover 100' covers the front face 14' together with a gasket 102' to prevent EMI.

All other features of the module 10' are similar to the module 10 including the external dimensions and tabs of the module such that a module 10' may be interchangeable in a chassis with a module 10. Further, the module 10' has the same impedance matching and parasitic reactance compensation previously mentioned with respect to module 10. As a result, the invention of module 10 is incorporated into module 10' with module 10' showing a specific embodiment of the invention for use with an equalizer component. It will be appreciated that equalizer components 64' are commercially available items. An example of such is product number G75-000 of ADC Broadband Communications Division, 999 Research Parkway, Meridan, Conn. 06450.

FIGS. 19-25 illustrate a third embodiment of the present invention for use in a 6-port directional coupler. The directional couplers are used to split or add multiple signals. Elements similarly numbered with respect to the previously described embodiments are numbered similarly in FIGS. 19-25 with the addition of a double apostrophe to distinguish between the embodiments.

In FIGS. 19-25, a module 10" includes a housing 12" having a base 18" and sidewalls 22", 24". The module 10" further includes a front face 14" and a rear face 16". A side cover 20" closes the module 10".

As in the previously described embodiments, the present invention incorporates a printed circuit board 44" containing circuit components. The printed circuit board 44" is maintained in parallel spaced relation between the sidewalls 20" and the lower sidewall 18" by support post 42" and associated screws 43".

The circuit components include six directional couplers 50-1" through 50-6", each with individually associated attenuator plugs 64-1" through 64-6" which are removably secured to individual base members 60-1" through 60-6". Each of the attenuator plugs 64-1" through 64-6" may be removed or replaced through openings 36" in the forward wall 14".

The rear wall 16" contains coax connectors 40-0" through 40-6". Coaxial cables (not shown in Figs.) extend from each of the coax connectors 40-0" through 40-6" and beneath the printed circuit board 44" in a manner identical with that described with reference to the first preferred embodiment of FIG. 1. Further, as in the previous embodiment, circuit board 44" contains an electrically conductive layer opposing and electrically connected to surface 18". Also, the circuit paths on the upper surface of the board 44" are provided to balance impedances as previously described.

The coaxial cables will extend between the board 44" and the surface 18" for reasons previously discussed. The circuit paths on the board 44" are disposed such that six incoming signals may be separately connected to each of connectors 40-1" through 40-6" and passed through the individual attenuators 64-1" through 64-6" into the directional couplers 50-1" through 50-6" where the six signals will be joined into a common output signal passed to connector 40-0". As with the previous embodiment, a cover 100" covers the front face 14" together with a gasket 102" to prevent EMI.

All of the features of the module 10" are similar to the modules 10, 10' including the external dimensions and tabs of the modules such that the modules 10", 10' and 10 may be interchangeable in a common chassis. Further, the module 10" has the same impedance matching and parasitic reactants compensation previously mentioned with respect to module 10. As a result, the invention of modules 10 and 10' is incorporated into module 10" with module 10" showing a specific embodiment of the invention for use with a 6-port directional coupler circuit.

Figure 26:
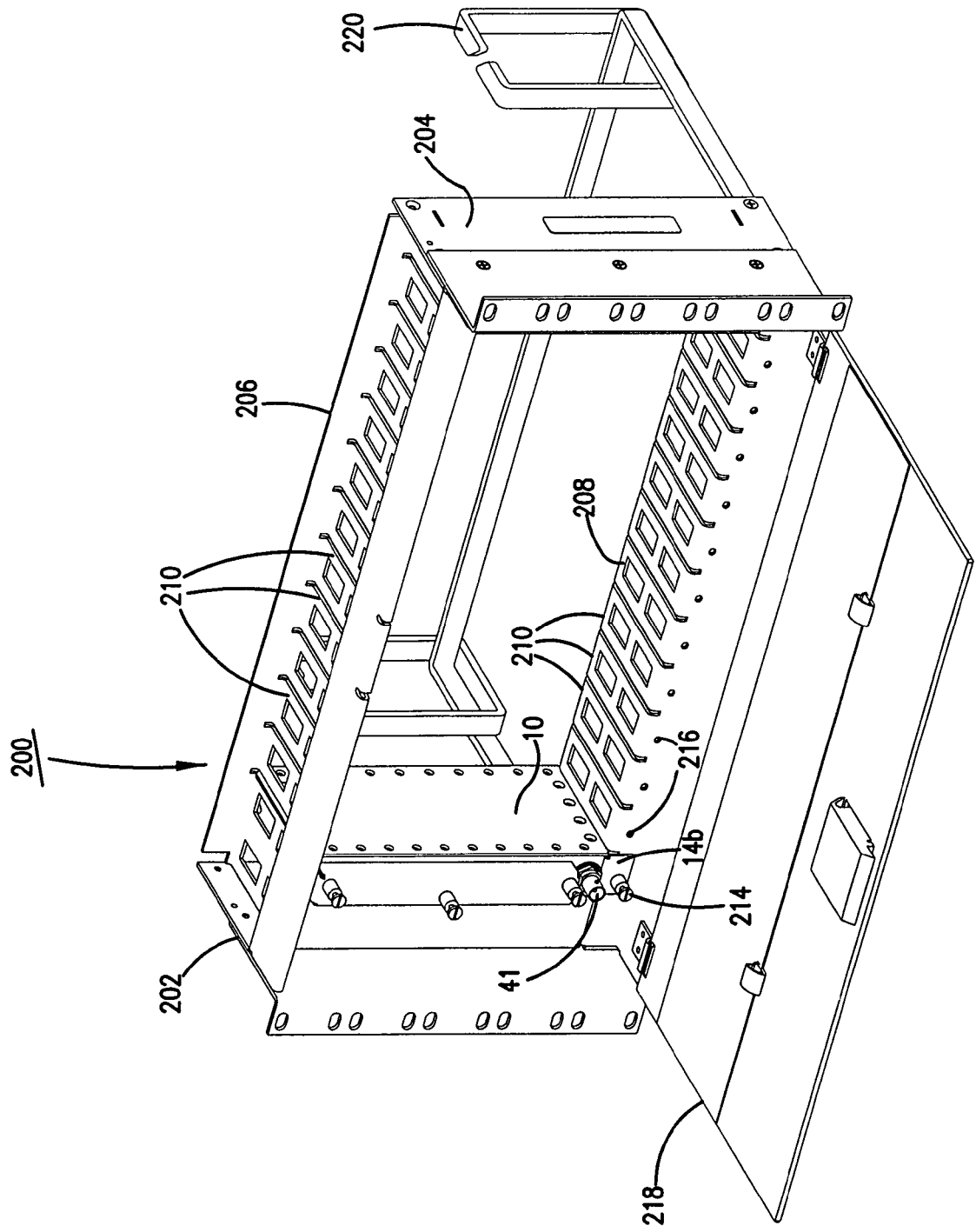
FIG. 26 is a perspective view of a first embodiment of a chassis for holding modules according to the present invention.

FIG. 26 shows a first chassis 200 for housing a plurality of modules 10. The chassis 200 includes horizontally spaced apart sidewalls 202, 204 and vertically spaced apart top and bottom walls 206, 208. The top and bottom walls 206, 208 are spaced apart by a distance substantially equal to a distance between the end walls 22, 24 of the module 10.

Each of the top and bottom walls 206, 208 includes a plurality of vertically aligned grooves 210. The grooves 210 are sized to slidably receive the projecting flanges 20a, 20b of the module 10 such that a module may be slidably inserted into the frame 200 with the modules 10 vertically positioned. In the embodiment shown, there are 12 pairs of vertically aligned grooves 210 such that 12 modules may be inserted into the frame 200. Since the flanges 20a, 20b of the modules 10 are offset from a longitudinal plane of the module 10, the grooves 210 are offset from module receiving spaces so that the entire open space between the sidewalls of the frame may be filled with modules. Also, the grooves 210 are spaced apart a distance selected such that as modules are slidably inserted into the frame, adjacent modules are positioned with a small spacing between opposing sidewalls of adjacent modules 10.

Locking screws 214 are provided on the projecting tabs 14a, 14b of the front walls 14 of the modules 10. Corresponding threaded locking holes 216 are provided on both the top and bottom walls 206, 208 of the frame 200. The screws 214 are not centrally positioned on the tabs 14a, 14b. Instead, they are laterally offset from a central longitudinal axis of the front wall 14. The holes 216 are similarly offset to require that a module 10 be placed in the frame 200 in a desired orientation and cannot be flipped 180° to be inserted in an undesired orientation. The frame 200 also includes a hinged cover 218 which preferably is transparent to permit an operator to inspect the interior. Cable management brackets 220 are provided on the rear of the chassis 200.

Figure 27:
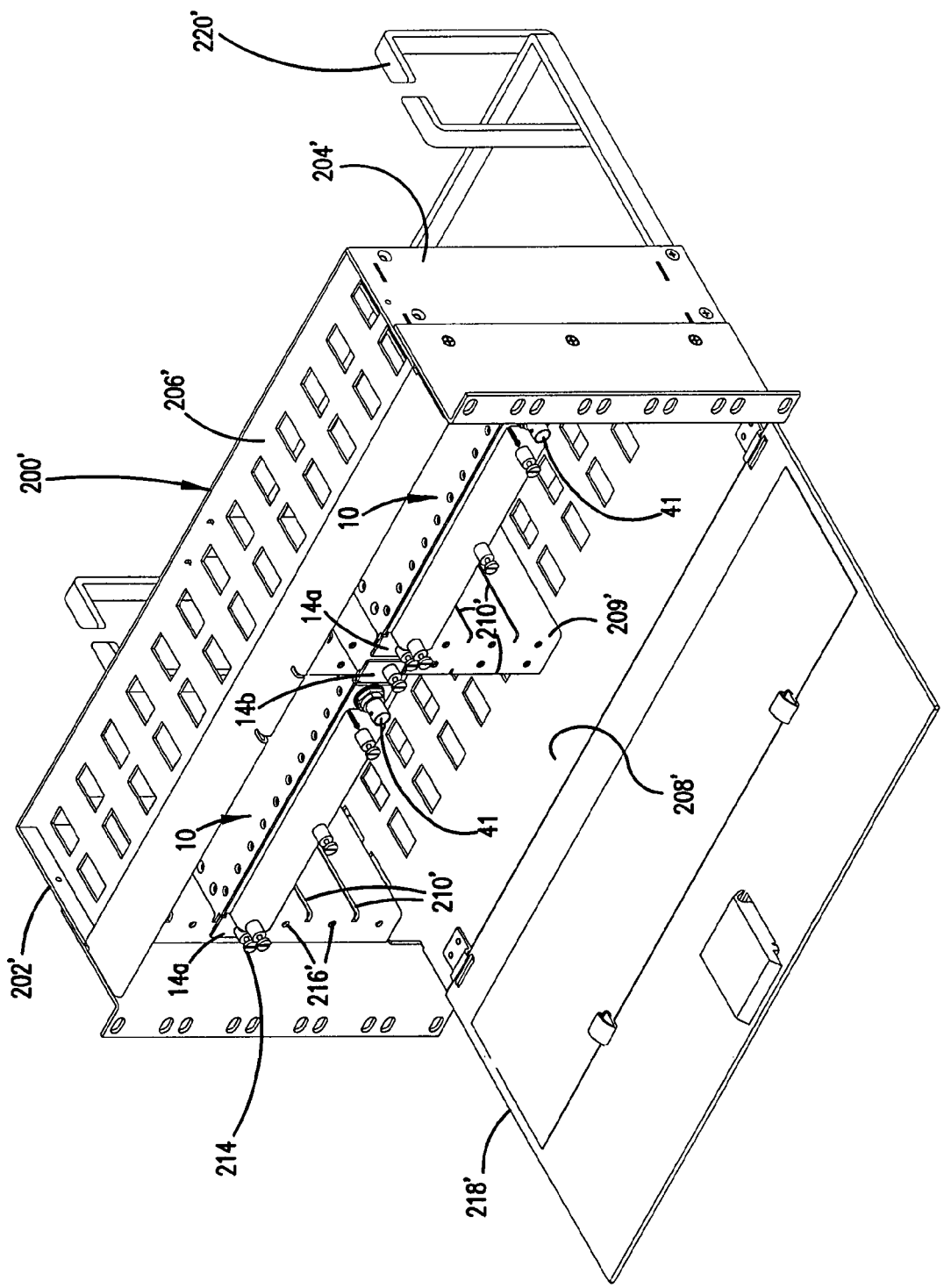
FIG. 27 is a perspective view of a second embodiment of a chassis for holding modules of the present invention.

From time to time, a customer or purchaser of the modules 10 may desire to hold the modules 10 in a horizontal alignment rather than the vertical alignment of FIG. 26. An alternative chassis 200' is shown in FIG. 27 for holding the modules 10 in a horizontal alignment. In FIG. 27, the chassis 200' includes horizontally spaced apart sidewalls 202', 204' and vertically spaced apart top and bottom walls 206', 208'. An intermediate wall 209' is provided midway and parallel to side walls 202', 204'. The distance between either of side walls 202', 204' and midwall 209' is equal to a distance between the end walls 22, 24 of the module 10.

Each of the sidewalls 202', 204' and the midwall 209' include a plurality of horizontally aligned grooves 210'. The grooves 210' are sized to slidably receive the projecting flanges 20a, 20b of the module 10 such that a module may be slidably inserted into the frame 200' with the module 10 horizontally positioned.

In the embodiment shown in FIG. 27, there are six pairs of horizontally aligned grooves 210' on both sides of the center wall 209' such that the frame 200' can contain a total of 12 modules. As a result, chassis 200 and 200' give an operator the opportunity to contain the exact same number of modules 10 in either a horizontal or a vertical alignment as the operator may select.

Also, the locking screws 214 of the modules are aligned with locking holes 216' on the side walls 202', 204' and mid wall 209'. Since the screw 214 are not centrally positioned on tabs 14a, 14b, and the holes 216' are not centrally positioned in modules receiving spaces, a module 10 must be placed in the frame 200 in a desired orientation and cannot be flipped 180° to an undesired orientation. As in the embodiment of FIG. 26, the frame 200' of FIG. 27 includes a hinged cover 218' and cable management brackets 220'.

Figure 28:
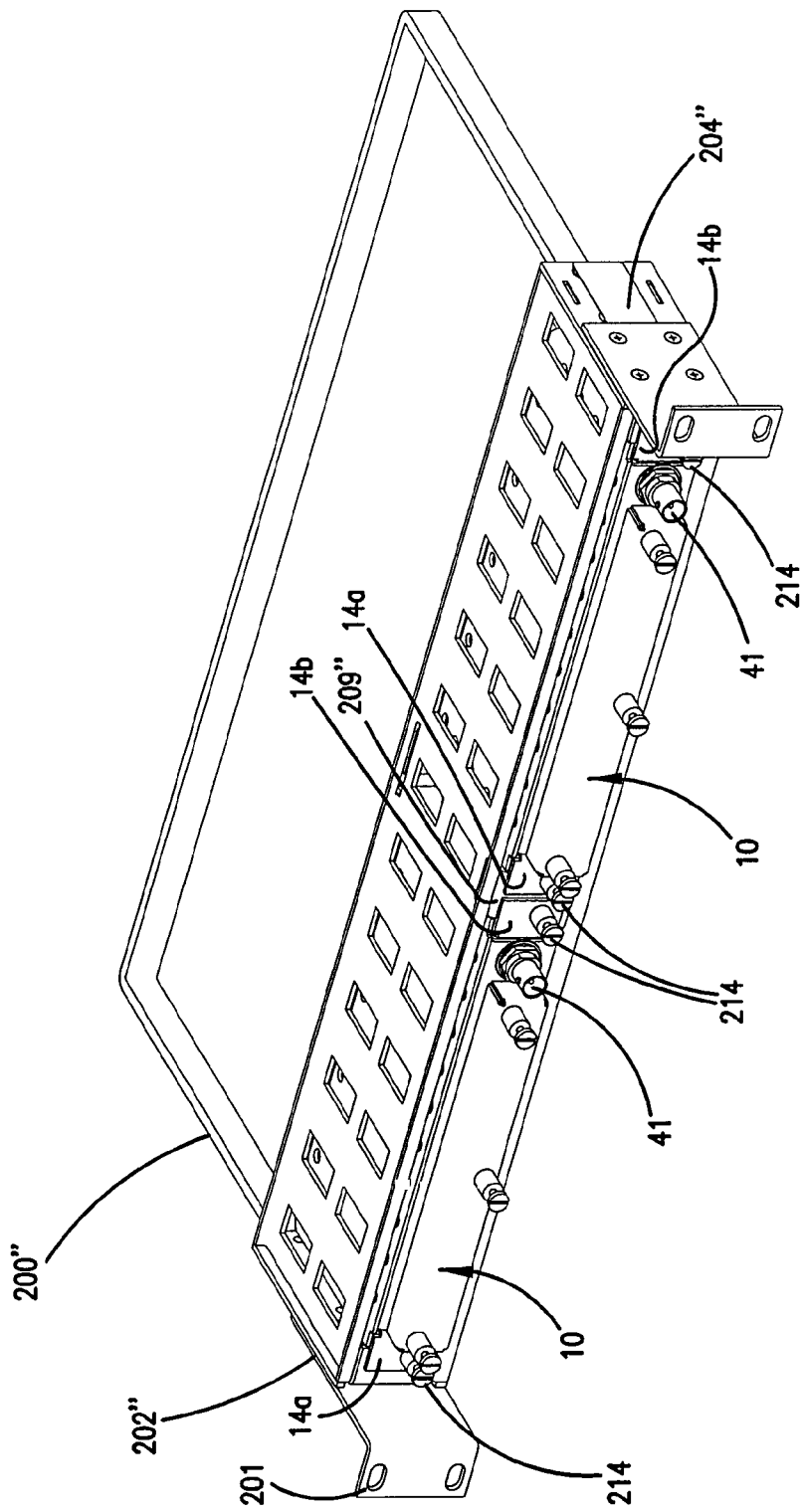
FIG. 28 is a perspective view of a third embodiment of a chassis for holding modules of the present invention.

Finally, FIG. 28 shows a chassis 200" which may be used in the event that an operator does not wish to have a combined total of 12 modules but instead only wishes to have a fewer number of modules. Chassis 200' retains two modules 10 in side-by-side horizontal alignment and includes mounting brackets 201 for mounting to a frame structure so that an operator can elect to mount pairs of modules at a time rather than twelve modules 10. Frame 200" is similar to frame 200' in that it has an intermediate wall 209" between side walls 202" and 204" with the locking screws 214 received within holes (not shown) of walls 202", 204" and 209".

What is claimed is:

1. A radio frequency (RF) module wherein the module is a passive RF module, the module comprising:
    a housing defining an interior;
    at least one RF signal input and at least one RF signal output, the RF signal input and output accessible from a back of the module;
    a circuit board having RF circuitry, the circuit board located at least partially within the interior of the housing, the RF circuitry being electrically connected to the RF signal input and output;
    a plurality of removable plugs with contacts electrically connected to the RF circuitry without the contacts penetrating the circuit board;
    the plurality of removable plugs being aligned in a linear array, wherein the plugs extend toward a front of the module allowing an operator to grasp the plugs and remove the plugs from the front of the module; and
    a removable front cover positioned over the plurality of plugs, the cover preventing access to the plugs and the RF circuitry of the circuit board from the front when secured to the housing;
    wherein the RF passive module is at least one of a splitter module, a combiner module, an equalizer module, and a directional coupler module.

2. The module according to claim 1, wherein each of the removable plugs is at least one of an attenuator plug and an equalizer plug.

3. The module according to claim 1, wherein the housing includes front face structure defining a hole through which at least one of the plugs extends when electrically connected to the RF circuitry.

4. The module according to claim 1, wherein the housing includes front face structure defining a plurality of separate holes, wherein each plug of the plurality of plugs extends through its own separate hole when electrically connected to the RF circuitry.

5. The module according to claim 1, wherein the housing includes front face structure.

6. The module according to claim 5, wherein the front face structure is formed integral with the housing.

7. The module according to claim 5, further including a support member to assist in guiding at least one of the plugs into electrical connection with the RF circuitry, wherein the support member is attached to a backside of the front face structure.

8. The module according to claim 7, wherein the front face structure is formed integral with the housing and wherein the support member is a separate component attached to the front face structure.

9. The module according to claim 1, wherein the housing includes opposing sidewalls, and wherein the circuit board is generally parallel to and between the sidewalls.

10. The module according to claim 9, wherein the circuit board includes a component side that opposes a first sidewall of the opposing sidewalls, wherein at least a portion of the first sidewall is attached to the housing with fasteners.

11. The module according to claim 1, wherein the RF signal output and the RF signal input each include a coax connector positioned adjacent the back of the module and electrically connected with the RF circuitry.

12. The module according to claim 1, wherein the module further includes a support member to assist in guiding at least one of the plugs into electrical connection with the RF circuitry.

13. The module according to claim 12, wherein the support member defines at least one interior groove from a front end of the support member to a back end of the support member.

14. The module according to claim 1, wherein the housing includes opposing sidewalls, wherein the circuit board is positioned generally parallel to the sidewalls, wherein a base member is positioned adjacent a leading edge of the circuit board and is adapted for releasably connecting at least one of the plugs to the circuit board.

15. The module according to claim 14, wherein the opposing sidewalls have a thickness, and wherein the module comprises a support member having at least one guide wall that assists in guiding at least one of the plugs toward the base member, the guide wall having a depth that extends toward the base member, the depth being greater than the thickness of one of the opposing sidewalls.

16. The module according to claim 15, wherein the support member is a separate component attached to the housing.

17. The module according to claim 14, the module further including a support member to assist in guiding at least one of the plugs toward the base member.

18. The module according to claim 1, wherein the housing includes opposing sidewalls, the sidewalls having a thickness; wherein the module further includes a support member to assist in guiding at least one of the plugs into electrical connection with the RF circuitry; wherein the support member includes at least one guide wall, the guide wall having a depth, the depth being greater than the thickness of one of the opposing sidewalls.

19. The module according to claim 18, wherein the support member is a separate component attached to the housing.

20. The module according to claim 18, further including front face structure defining a hole which is sized and arranged to permit an electrically connected plug to extend through the hole.

21. The module according to claim 20, wherein the removable cover is sized to cover at least a portion of the front face structure including the hole.

22. The module according to claim 1, wherein the housing comprises electrically conductive material.

23. The module according to claim 1, further comprising a front monitor port electrically connected to the RF circuitry.

24. The module according to claim 23, wherein the monitor port is positioned outside the cover.

25. The module according to claim 1, wherein at least one of the removable plugs is an attenuator plug.

26. The module according to claim 25, further comprising a base member electrically connected to the attenuator plug, wherein the base member and attenuator plug cooperate to attenuate an RF signal.

27. The module according to claim 1, wherein at least one of the removable plugs is an equalizer plug.

28. The module according to claim 1, wherein the module is adapted for being inserted into a chassis, the chassis having receiving locations for receiving a plurality of modules.

29. The module according to claim 28, wherein the module includes flanges extending from the housing, and wherein the chassis receiving locations includes grooves corresponding to the flanges with each flange of the module being received in a groove.

30. The module according to claim 1, wherein the module is a splitter module.

31. The module according to claim 1, wherein the module is a combiner module.

32. The module according to claim 1, further comprising a front monitor port electrically connected to the RF circuitry and which is accessible from the front of the module even when the front cover is secured to the housing.

33. The module according to claim 1, further comprising a plurality of base members electrically connected to the RF circuitry, each base member defining at least one receptacle for removably receiving at least one contact of at least one removable plug and making an electrical interconnection between the at least one removable plug and the circuit board.

34. The module according to claim 1, wherein the cover is electrically connected to the housing.

35. A radio frequency (RF) module wherein the module is a passive RF module, the module comprising:
a housing defining an interior;
at least one RF signal input and at least one RF signal output, the RF signal input and output accessible from a back of the module;
RF circuitry at least partially within the interior of the housing of the passive RF module, the RF circuitry being electrically connected to the RF signal input and output;
at least one removable plug adapted for electrically connecting to the RF circuitry;
wherein the at least one plug extends toward a front of the module allowing an operator to grasp the plug and remove the plug from the front of the module; and
a removable front cover positioned over the at least one plug, the cover preventing access to the RF circuitry and the at least one plug from the front when secured to the housing;
wherein the RF passive module is at least one of a splitter module, a combiner module, an equalizer module, and a directional coupler module.

36. The module according to claim 35, wherein the removable plug is at least one of an attenuator plug and an equalizer plug.

37. The module according to claim 35, wherein the housing includes front face structure defining a hole through which the plug extends when electrically connected to the RF circuitry.

38. The module according to claim 35, wherein the module includes a plurality of removable plugs adapted for electrically connecting to the RF circuitry; wherein the housing includes front face structure defining a plurality of separate holes, wherein each plug of the plurality of plugs extends through its own separate hole when electrically connected to the RF circuitry.

39. The module according to claim 35, wherein the housing includes front face structure.

40. The module according to claim 39, wherein the front face structure is formed integral with the housing.

41. The module according to claim 35, further comprising a circuit board having the RF circuitry, wherein the housing includes opposing sidewalls, and wherein the circuit board is generally parallel to and between the sidewalls.

42. The module according to claim 41, wherein the circuit board includes a component side that opposes a first sidewall of the opposing sidewalls, wherein at least a portion of the first sidewall is attached to the housing with fasteners.

43. The module according to claim 35, wherein the RF signal output and the RF signal input each include a coax connector positioned adjacent the back of the module and electrically connected with the RF circuitry.

44. The module according to claim 35, wherein the module further includes a support member to assist in guiding the at least one plug into electrical connection with the RF circuitry.

45. The module according to claim 44, wherein the support member defines at least one interior groove from a front end of the support member to a back end of the support member.

46. The module according to claim 39, further including a support member to assist in guiding the at least one plug into electrical connection with the RF circuitry, wherein the support member is attached to a backside of the front face structure.

47. The module according to claim 46, wherein the front face structure is formed integral with the housing and wherein the support member is a separate component attached to the front face structure.

48. The module according to claim 35, wherein the housing includes opposing sidewalls, the module further including a circuit board at least partially within the interior and positioned generally parallel to and between the sidewalls, wherein a base member is positioned adjacent a leading edge of the circuit board and is adapted for releasably connecting the plug to the circuit board.

49. The module according to claim 48, wherein the opposing sidewalls have a thickness, and wherein the module comprises a support member having at least one guide wall that assists in guiding the at least one plug toward the base member, the guide wall having a depth that extends toward the base member, the depth being greater than the thickness of one of the opposing sidewalls.

50. The module according to claim 49, wherein the support member is a separate component attached to the housing.

51. The module according to claim 48, the module further including a support member to assist in guiding the at least one plug toward the base member.

52. The module according to claim 35, wherein the housing includes opposing sidewalls, the sidewalls having a thickness; wherein the module further includes a support member to assist in guiding the at least one plug into electrical connection with the RF circuitry; wherein the support member includes at least one guide wall, the guide wall having a depth, the depth being greater than the thickness of one of the opposing sidewalls.

53. The module according to claim 52, wherein the support member is a separate component attached to the housing.

54. The module according to claim 52, further including front face structure defining a hole which is sized and arranged to permit the at least one electrically connected plug to extend through the hole.

55. The module according to claim 54, wherein the removable cover is sized to cover at least a portion of the front face structure including the hole.

56. The module according to claim 35, wherein the housing comprises electrically conductive material.

57. The module according to claim 35, further comprising a front monitor port electrically connected to the RF circuitry.

58. The module according to claim 57, wherein the monitor port is positioned outside the cover.

59. The module according to claim 35, wherein the at least one removable plug is an attenuator plug.

60. The module according to claim 59, further comprising a base member electrically connected to the attenuator plug, wherein the base member and attenuator plug cooperate to attenuate an RF signal.

61. The module according to claim 35, wherein the at least one plug is an equalizer plug.

62. The module according to claim 35, wherein the module is adapted for being inserted into a chassis, the chassis having receiving locations for receiving a plurality of modules.

63. The module according to claim 62, wherein the module includes flanges extending from the housing, and wherein the chassis receiving locations includes grooves corresponding to the flanges with each flange of the module being received in a groove.

64. The module according to claim 35, wherein the module is a splitter module.

65. The module according to claim 35, wherein the module is a combiner module.

66. The module according to claim 35, further comprising a front monitor port electrically connected to the RF circuitry and which is accessible from the front of the module even when the front cover is secured to the housing.

67. The module according to claim 35, further comprising: a circuit board positioned at least partially within the interior of the housing; a plurality of removable plugs with contacts electrically connected to the RF circuitry without the contacts penetrating the circuit board; a plurality of base members electrically connected to the RF circuitry, each base member defining at least one receptacle for removably receiving at least one contact of at least one removable plug and making an electrical interconnection between the at least one removable plug and the circuit board.

68. The module according to claim 35, wherein the cover is electrically connected to the housing.

69. A radio frequency (RF) module wherein the module is a passive RF module, the module comprising:
a housing defining an interior;
at least one RF signal input and at least one RF signal output, the RF signal input and output accessible from a back of the module;
a circuit board having RF circuitry at least partially within the interior of the housing of the passive RF module, the RF circuitry being electrically connected to the RF signal input and output;
at least one removable plug adapted for electrically connecting to the RF circuitry;
a front of the housing provided with at least one hole, wherein the at least one plug extends through the hole when the plug is electrically connected to the RF circuitry, allowing an operator to grasp the plug and remove the plug from the front of the housing;
wherein the RF passive module is at least one of a splitter module, a combiner module, an equalizer module, and a directional coupler module.

70. The module according to claim 69, wherein the removable plug is at least one of an attenuator plug and an equalizer plug.

71. The module according to claim 69, wherein the module includes a plurality of removable plugs adapted for electrically connecting to the RF circuitry; wherein the housing includes front face structure defining a plurality of separate holes, wherein each plug of the plurality of plugs extends through its own separate hole when electrically connected to the RF circuitry.

72. The module according to claim 69, wherein the housing includes front face structure defining the hole through which the at least one plug extends when electrically connected to the RF circuitry.

73. The module according to claim 72, wherein the front face structure is formed integral with the housing.

74. The module according to claim 72, further including a support member to assist in guiding the at least one plug into electrical connection with the RF circuitry, wherein the support member is attached to a backside of the front face structure.

75. The module according to claim 74, wherein the front face structure is formed integral with the housing and wherein the support member is a separate component attached to the front face structure.

76. The module according to claim 69, wherein the housing includes opposing sidewalls, and wherein the circuit board is generally parallel to and between the sidewalls.

77. The module according to claim 76, wherein the circuit board includes a component side that opposes a first sidewall of the opposing sidewalls, wherein at least a portion of the first sidewall is attached to the housing with fasteners.

78. The module according to claim 69, wherein the RF signal output and the RF signal input each include a coax connector positioned adjacent the back of the module and electrically connected with the RF circuitry.

79. The module according to claim 69, wherein the module further includes a support member to assist in guiding the at least one plug into electrical connection with the RF circuitry.

80. The module according to claim 79, wherein the support member defines at least one interior groove from a front end of the support member to a back end of the support member.

81. The module according to claim 69, wherein the housing includes opposing sidewalls, wherein the circuit board is positioned generally parallel to the sidewalls, wherein a base member is positioned adjacent a leading edge of the circuit board and is adapted for releasably connecting the plug to the circuit board.

82. The module according to claim 81, wherein the opposing sidewalls have a thickness, and wherein the module comprises a support member having at least one guide wall that assists in guiding the at least one plug toward the base member, the guide wall having a depth that extends toward the base member, the depth being greater than the thickness of one of the opposing sidewalls.

83. The module according to claim 82, wherein the support member is a separate component attached to the housing.

84. The module according to claim 81, the module further including a support member to assist in guiding the at least one plug toward the base member.

85. The module according to claim 69, wherein the housing includes opposing sidewalls, the sidewalls having a thickness; wherein the module further includes a support member to assist in guiding the at least one plug into electrical connection with the RF circuitry; wherein the support member includes at least one guide wall, the guide wall having a depth, the depth being greater than the thickness of one of the opposing sidewalls.

86. The module according to claim 85, wherein the support member is a separate component attached to the housing.

87. The module according to claim 85, further including front face structure defining the hole which is sized and arranged to permit the at least one electrically connected plug to extend through the hole.

88. The module according to claim 87, further including a removable cover sized to cover at least a portion of the front face structure including the hole.

89. The module of claim 88, wherein the cover is electrically connected to the housing.

90. The module according to claim 69, wherein the housing comprises electrically conductive material.

91. The module according to claim 69, further comprising a front monitor port electrically connected to the RF circuitry.

92. The module according to claim 91, further including a removable front cover positioned over the at least one plug, the cover preventing access to the plug and the RF circuitry from the front when secured to the housing; wherein the monitor port is positioned outside the cover.

93. The module according to claim 69, wherein the at least one removable plug is an attenuator plug.

94. The module according to claim 93, further comprising a base member electrically connected to the attenuator plug, wherein the base member and attenuator plug cooperate to attenuate an RF signal.

95. The module according to claim 69, wherein the at least one plug is an equalizer plug.

96. The module according to claim 69, wherein the module is adapted for being inserted into a chassis, the chassis having receiving locations for receiving a plurality of modules.

97. The module according to claim 96, wherein the module includes flanges extending from the housing, and wherein the chassis receiving locations includes grooves corresponding to the flanges with each flange of the module being received in a groove.

98. The module according to claim 69, wherein the module is a splitter module.

99. The module according to claim 69, wherein the module is a combiner module.

100. The module according to claim 69, further comprising: a plurality of removable plugs with contacts electrically connected to the RF circuitry without the contacts penetrating the circuit board; a plurality of base members electrically connected to the RF circuitry, each base member defining at least one receptacle for removably receiving at least one contact of at least one removable plug and making an electrical interconnection between the at least one removable plug and the circuit board.

101. A radio frequency (RF) module wherein the module is a passive RF module, the module comprising:
    a housing defining an interior;
    at least one RF signal input and at least one RF signal output, the RF signal input and output accessible from a back of the module;
    a circuit board having RF circuitry at least partially within the interior of the housing of the passive RF module, the RF circuitry being electrically connected to the RF signal input and output;
    a plurality of removable plugs adapted for electrically connecting to the RF circuitry;
    the plurality of removable plugs being aligned in a linear array, wherein the plurality of plugs extend toward a front of the module allowing an operator to grasp the plugs and remove the plugs from the front of the module; and
    wherein the RF passive module is at least one of a splitter module, a combiner module, an equalizer module, and a directional coupler module.

102. The module according to claim 101, wherein each of the removable plugs is at least one of an attenuator plug and an equalizer plug.

103. The module according to claim 101, further including front face structure, the front face structure defining a hole through which at least one of the plugs extends through.

104. The module according to claim 101, wherein the housing includes front face structure defining a plurality of separate holes, wherein each plug of the plurality of plugs extends through its own separate hole when electrically connected to the RF circuitry.

105. The module according to claim 101, wherein the housing includes front face structure.

106. The module according to claim 105, wherein the front face structure is formed integral with the housing.

107. The module according to claim 105, further including a support member to assist in guiding at least one of the plugs into electrical connection with the RF circuitry, wherein the support member is attached to a backside of the front face structure.

108. The module according to claim 107, wherein the front face structure is formed integral with the housing and wherein the support member is a separate component attached to the front face structure.

109. The module according to claim 101, wherein the housing includes opposing sidewalls, and wherein the circuit board is generally parallel to and between the sidewalls.

110. The module according to claim 109, wherein the circuit board includes a component side that opposes a first sidewall of the opposing sidewalls, wherein at least a portion of the first sidewall is attached to the housing with fasteners.

111. The module according to claim 101, wherein the RF signal output and the RF signal input each include a coax connector positioned adjacent the back of the module and electrically connected with the RF circuitry.

112. The module according to claim 101, wherein the module further includes a support member to assist in guiding at least one of the plugs into electrical connection with the RF circuitry.

113. The module according to claim 112, wherein the support member defines at least one interior groove from a front end of the support member to a back end of the support member.

114. The module according to claim 101, wherein the housing includes opposing sidewalls, wherein the circuit board is positioned generally parallel to the sidewalls, wherein a base member is positioned adjacent a leading edge of the circuit board and is adapted for releasably connecting at least one of the plugs to the circuit board.

115. The module according to claim 114, wherein the opposing sidewalls have a thickness, and wherein the module comprises a support member having at least one guide wall that assists in guiding at least one of the plugs toward the base member, the guide wall having a depth that extends toward the base member, the depth being greater than the thickness of one of the opposing sidewalls.

116. The module according to claim 115, wherein the support member is a separate component attached to the housing.

117. The module according to claim 114, the module further including a support member to assist in guiding at least one of the plugs toward the base member.

118. The module according to claim 101, wherein the housing includes opposing sidewalls, the sidewalls having a thickness; wherein the module further includes a support member to assist in guiding at least one of the plugs into electrical connection with the RF circuitry; wherein the support member includes at least one guide wall, the guide wall having a depth, the depth being greater than the thickness of one of the opposing sidewalls.

119. The module according to claim 118, wherein the support member is a separate component attached to the housing.

120. The module according to claim 118, further including front face structure defining a hole which is sized and arranged to permit an electrically connected plug to extend through the hole.

121. The module according to claim 120, further including a removable cover sized to cover at least a portion of the front face structure including the hole.

122. The module according to claim 121, wherein the cover is electrically connected to the housing.

123. The module according to claim 101, wherein the housing comprises electrically conductive material.

124. The module according to claim 101, further comprising a front monitor port electrically connected to the RF circuitry.

125. The module according to claim 124, further including a removable front cover positioned over the plugs, the cover preventing access to the plugs and the RF circuitry from the front when secured to the housing; wherein the monitor port is positioned outside the cover.

126. The module according to claim 101, wherein at least one of the removable plugs is an attenuator plug.

127. The module according to claim 126, further comprising a base member electrically connected to the attenuator plug, wherein the base member and attenuator plug cooperate to attenuate an RF signal.

128. The module according to claim 101, wherein at least one of the removable plugs is an equalizer plug.

129. The module according to claim 101, wherein the module is adapted for being inserted into a chassis, the chassis having receiving locations for receiving a plurality of modules.

130. The module according to claim 129, wherein the module includes flanges extending from the housing, and wherein the chassis receiving locations includes grooves corresponding to the flanges with each flange of the module being received in a groove.

131. The module according to claim 101, wherein the module is a splitter module.

132. The module according to claim 101, wherein the module is a combiner module.

133. The module according to claim 101, further comprising: the plurality of removable plugs with contacts electrically connected to the RF circuitry without the contacts penetrating the circuit board; a plurality of base members electrically connected to the RF circuitry, each base member defining at least one receptacle for removably receiving at least one contact of at least one removable plug and making an electrical interconnection between the at least one removable plug and the circuit board.

134. A radio frequency (RF) module wherein the module is a passive RF module, the module comprising:
a housing defining an interior, the housing having a front and a back;
at least one RF signal input location and at least one RF signal output location, the RF signal input and output locations positioned at a back of the module;
opposing sidewalls separating the front and the back of the housing, wherein the module includes a circuit board at least partially within the interior and positioned generally parallel to and between the sidewalls, the circuit board comprising RF circuitry, the RF circuitry electrically connected to the RF signal input and output locations;
at least one removable plug adapted for electrically connecting to the RF circuitry; and
front face structure, the front face structure defining at least one hole through which the at least one removable plug may be inserted to make electrical connection to the RF circuitry;
wherein the RF passive module is at least one of a splitter module, a combiner module, an equalizer module, and a directional coupler module.

135. The module according to claim 134, wherein the removable plug is at least one of an attenuator plug and an equalizer plug.

136. The module according to claim 134, wherein the at least one plug extends through the hole when electrically connected to the RF circuitry.

137. The module according to claim 134, wherein the module includes a plurality of removable plugs adapted for electrically connecting to the RF circuitry; wherein the front face structure defines a plurality of separate holes, wherein each plug of the plurality of plugs extends through its own separate hole when electrically connected to the RF circuitry.

138. The module according to claim 134, wherein the front face structure is formed integral with the housing.

139. The module according to claim 134, wherein the circuit board includes a component side that opposes a first sidewall of the opposing sidewalls, wherein at least a portion of the first sidewall is attached to the housing with fasteners.

140. The module according to claim 134, wherein the RF signal output location and the RF signal input location each include a coax connector positioned adjacent the back of the module and electrically connected with the RF circuitry.

141. The module according to claim 134, wherein the module further includes a support member to assist in guiding the at least one plug into electrical connection with the RF circuitry.

142. The module according to claim 141, wherein the support member defines at least one interior groove from a front end of the support member to a back end of the support member.

143. The module according to claim 134, further including a support member to assist in guiding the at least one plug into electrical connection with the RF circuitry, wherein the support member is attached to a backside of the front face structure.

144. The module according to claim 143, wherein the front face structure is formed integral with the housing and wherein the support member is a separate component attached to the front face structure.

145. The module according to claim 134, wherein a base member is positioned adjacent a leading edge of the circuit board and is adapted for releasably connecting the plug to the circuit board.

146. The module according to claim 145, wherein the opposing sidewalls have a thickness, and wherein the module comprises a support member having at least one guide wall that assists in guiding the at least one plug toward the base member, the guide wall having a depth that extends toward the base member, the depth being greater than the thickness of one of the opposing sidewalls.

147. The module according to claim 146, wherein the support member is a separate component attached to the housing.

148. The module according to claim 145, the module further including a support member to assist in guiding the at least one plug toward the base member.

149. The module according to claim 134, wherein the sidewalls have a thickness; wherein the module further includes a support member to assist in guiding the at least one plug into electrical connection with the RF circuitry; wherein the support member includes at least one guide wall, the guide wall having a depth, the depth being greater than the thickness of one of the opposing sidewalls.

150. The module according to claim 149, wherein the support member is a separate component attached to the housing.

151. The module according to claim 149, wherein the at least one electrically connected plug extends through the hole.

152. The module according to claim 151, further including a removable cover sized to cover at least a portion of the front face structure including the hole.

153. The module according to claim 152, wherein the cover is electrically connected to the housing.

154. The module according to claim 134, wherein the housing comprises electrically conductive material.

155. The module according to claim 134, further comprising a front monitor port electrically connected to the RF circuitry.

156. The module according to claim 155, further including a removable front cover positioned over the at least one plug, the cover preventing access to the at least one plug and the RF circuitry from the front when secured to the housing; wherein the monitor port is positioned outside the cover.

157. The module according to claim 134, wherein the at least one removable plug is an attenuator plug.

158. The module according to claim 157, further comprising a base member electrically connected to the attenuator plug, wherein the base member and attenuator plug cooperate to attenuate an RF signal.

159. The module according to claim 134, wherein the at least one plug is an equalizer plug.

160. The module according to claim 134, wherein the module is adapted for being inserted into a chassis, the chassis having receiving locations for receiving a plurality of modules.

161. The module according to claim 160, wherein the module includes flanges extending from the housing, and wherein the chassis receiving locations includes grooves corresponding to the flanges with each flange of the module being received in a groove.

162. The module according to claim 134, wherein the module is a splitter module.

163. The module according to claim 134, wherein the module is a combiner module.

164. The module according to claim 134, further comprising: a plurality of removable plugs with contacts electrically connected to the RF circuitry without the contacts penetrating the circuit board; a plurality of base members electrically connected to the RF circuitry, each base member defining at least one receptacle for removably receiving at least one contact of at least one removable plug and making an electrical interconnection between the at least one removable plug and the circuit board.

* * * * *